(12) United States Patent
Miyafuji

(10) Patent No.: US 12,221,563 B2
(45) Date of Patent: Feb. 11, 2025

(54) CURABLE COMPOSITION

(71) Applicant: KANEKA CORPORATION, Osaka (JP)

(72) Inventor: Kiyoshi Miyafuji, Takasago (JP)

(73) Assignee: KANEKA CORPORATION, Osaka (JP)

( * ) Notice: Subject to any disclaimer, the term of this patent is extended or adjusted under 35 U.S.C. 154(b) by 519 days.

(21) Appl. No.: 17/587,005

(22) Filed: Jan. 28, 2022

(65) Prior Publication Data

US 2022/0145068 A1    May 12, 2022

Related U.S. Application Data

(63) Continuation of application No. PCT/JP2020/028531, filed on Jul. 22, 2020.

(30) Foreign Application Priority Data

| Aug. 6, 2019 | (JP) | ................................ 2019-144295 |
| Aug. 6, 2019 | (JP) | ................................ 2019-144296 |

(51) Int. Cl.

| C09J 171/02 | (2006.01) |
| C08F 8/42 | (2006.01) |
| C08F 220/14 | (2006.01) |
| C08F 220/18 | (2006.01) |
| C08F 230/08 | (2006.01) |
| C08G 59/24 | (2006.01) |
| C08G 59/30 | (2006.01) |
| C08G 59/50 | (2006.01) |
| C08G 59/62 | (2006.01) |
| C08G 59/64 | (2006.01) |
| C08G 59/68 | (2006.01) |
| C08G 65/10 | (2006.01) |
| C08G 65/336 | (2006.01) |
| C08K 5/544 | (2006.01) |
| C08K 5/548 | (2006.01) |
| C08L 63/00 | (2006.01) |
| C09J 163/00 | (2006.01) |

(52) U.S. Cl.
CPC .............. *C09J 171/02* (2013.01); *C08F 8/42* (2013.01); *C08F 220/14* (2013.01); *C08F 220/1808* (2020.02); *C08F 230/08* (2013.01); *C08F 230/085* (2020.02); *C08G 59/245* (2013.01); *C08G 59/306* (2013.01); *C08G 59/5006* (2013.01); *C08G 59/5026* (2013.01); *C08G 59/5033* (2013.01); *C08G 59/623* (2013.01); *C08G 59/64* (2013.01); *C08G 59/686* (2013.01); *C08G 65/10* (2013.01); *C08G 65/336* (2013.01); *C08K 5/544* (2013.01); *C08K 5/548* (2013.01); *C08L 63/00* (2013.01); *C09J 163/00* (2013.01); *C08L 2205/03* (2013.01)

(58) Field of Classification Search
CPC .................................. C09J 171/02; C08L 71/02
See application file for complete search history.

(56) References Cited

U.S. PATENT DOCUMENTS

| 2014/0179830 A1 | 6/2014 | Burckhardt et al. |
| 2017/0088664 A1 | 3/2017 | Elgimiabi |
| 2017/0107374 A1 | 4/2017 | Harumashi et al. |
| 2018/0223139 A1 | 8/2018 | Miyafuji |
| 2019/0225795 A1 | 7/2019 | Yano et al. |

FOREIGN PATENT DOCUMENTS

| CN | 106795366 A | 5/2017 | |
| CN | 109415494 A | 3/2019 | |
| EP | 2684690 B1 * | 2/2018 | ........... C08G 65/336 |
| JP | H02-214759 A | 8/1990 | |
| JP | 2004323589 A * | 11/2004 | |
| JP | 2017-519869 A | 7/2017 | |
| WO | 2017/057719 A1 | 4/2017 | |
| WO | 2019/069866 A1 | 4/2019 | |
| WO | WO-2019235332 A1 * | 12/2019 | ........... C09J 163/00 |

OTHER PUBLICATIONS

International Search Report issued in corresponding International Application No. PCT/JP2020/028531, mailed on Sep. 29, 2020 (8 pages).
Written Opinion issued in corresponding International Application No. PCT/JP2020/028531, mailed on Sep. 29, 2020 (5 pages).

\* cited by examiner

*Primary Examiner* — Marc S Zimmer
(74) *Attorney, Agent, or Firm* — Osha Bergman Watanabe & Burton LLP

(57) ABSTRACT

A multi-part curable composition includes an A part including a polyoxyalkylene polymer (A) having a reactive silicon group, a (meth)acrylic ester polymer (B) having a reactive silicon group, an epoxy resin curing agent (D) having a tertiary amine moiety, an alicyclic structure-containing amine (E1), and a B part including an epoxy resin (C). Each of the reactive silicon groups of the polymer (A) and polymer (B) are represented by $-SiR^5_cX_{3-c}$. $R^5$ is a substituted or unsubstituted hydrocarbon group having 1 to 20 carbon atoms, X is a hydroxy group or a hydrolyzable group, and c is 0 or 1. A multi-part curable composition includes an A part including the polymer (A), polymer (B), and an epoxy resin curing agent (D) having a tertiary amine moiety, and a B part including an epoxy resin (C), where either or both of the A and B parts include an amino alcohol compound (E2).

19 Claims, No Drawings

CURABLE COMPOSITION

TECHNICAL FIELD

One or more embodiments of the present invention relate to a multi-part curable composition.

BACKGROUND

In the fields of automobiles, aircrafts, and railcars, the materials of their structural components are shifting from iron and steel to lightweight materials such as aluminum, magnesium, and carbon fiber composites for the purpose of weight reduction, and multi-material technology using a plurality of materials in one vehicle body is becoming widespread. Joining between different kinds of materials is sometimes difficult to accomplish by spot welding or laser welding and, for this reason, adhesive joining using an adhesive is attracting attention. Since steel plates, aluminum alloys, and fiber-reinforced composites have different linear expansion coefficients, the adhesive needs to be flexible enough to accommodate thermal distortion. In this regard, epoxy resins which have high stiffness could be disadvantageous. Thus, there is a growing demand for a new structural adhesive material that has a high elastic modulus and is flexible.

A composition composed of a reactive silicon group-containing polyoxyalkylene polymer and an epoxy resin and having both a high strength at break and flexibility is known as an adhesive (see Patent Literature 1, for example). However, this composition could fail to exhibit sufficient strength for use as a structural adhesive.

In this context, Patent Literature 2 discloses a multi-part curable composition including: an A part including a polyoxyalkylene polymer having more than one reactive silicon groups per molecular end and a reactive silicon group-containing (meth)acrylic ester polymer; and a B part including an epoxy resin. Patent Literature 2 teaches that this composition can be formed into a cured product having high strength, high stiffness, and flexibility and can be used as a structural adhesive.

PATENT LITERATURE

PTL 1: Japanese Laid-Open Patent Application Publication No. H02-214759
PTL 2: WO 2019/069866

In general, an adhesive composed of a reactive silicon group-containing organic polymer and an epoxy resin exhibits intended physical properties by being subjected to a long curing (aging) step requiring several days after joining of adherends.

However, a structural adhesive may be used to join adherends together in a line production system where a series of production steps are carried out continuously. In such a case, joining of the adherends is followed by a relatively short heating step to semi-cure the structural adhesive and then by the next step. To ensure the workability in the next and subsequent steps, the semi-cured structural adhesive is required to exhibit a certain level of stiffness.

The structural adhesive described in Patent Literature 2 can be formed into a high-strength cured product by being subjected to a long curing step. However, this structural adhesive cannot achieve a sufficient level of stiffness by being subjected to a relatively short heating step, and has the disadvantage of slow increase in stiffness.

SUMMARY

In view of the above circumstances, one or more embodiments of the present invention aim to provide a curable composition that can exhibit high stiffness by being subjected to a relatively short heating step and a cured product obtained by curing the composition.

The present inventors have found that the problems can be solved by blending an alicyclic structure-containing amine or an amino alcohol compound into a multi-part curable composition containing a reactive silicon group-containing polyoxyalkylene polymer, a reactive silicon group-containing (meth)acrylic ester polymer, and an epoxy resin. Based on this finding, the present inventors have completed one or more embodiments of the present invention.

Specifically, a first aspect of one or more embodiments of the present invention relates to a multi-part curable composition including: an A part including a polyoxyalkylene polymer (A) having a reactive silicon group, a (meth)acrylic ester polymer (B) having a reactive silicon group, an epoxy resin curing agent (D) having a tertiary amine moiety and being other than alicyclic structure-containing amines, and an alicyclic structure-containing amine (E1), each of the reactive silicon groups of the polyoxyalkylene polymer (A) and the (meth)acrylic ester polymer (B) being represented by the following formula (1): —$SiR^5_c X_{3-c}$ (1), wherein $R^5$ is a substituted or unsubstituted hydrocarbon group having 1 to 20 carbon atoms, X is a hydroxy group or a hydrolyzable group, and c is 0 or 1; and a B part including an epoxy resin (C).

The alicyclic structure-containing amine (E1) may be a compound having an amino group bonded directly to an alicyclic skeleton.

A second aspect of one or more embodiments of the present invention relates to a multi-part curable composition including: an A part including a polyoxyalkylene polymer (A) having a reactive silicon group, a (meth)acrylic ester polymer (B) having a reactive silicon group, and an epoxy resin curing agent (D) having a tertiary amine moiety and being other than amino alcohol compounds, each of the reactive silicon groups of the polyoxyalkylene polymer (A) and the (meth)acrylic ester polymer (B) being represented by the following formula (1): —$SiR^5_c X_{3-c}$ (1), wherein $R^5$ is a substituted or unsubstituted hydrocarbon group having 1 to 20 carbon atoms, X is a hydroxy group or a hydrolyzable group, and c is 0 or 1; and a B part including an epoxy resin (C), wherein either or both of the A and B parts include an amino alcohol compound (E2).

The amino alcohol compound (E2) may be an amino alcohol compound having no aromatic ring. The amino alcohol compound (E2) may be a trialcoholamine.

In both of the above aspects, the reactive silicon group of the polyoxyalkylene polymer (A) may be a trimethoxysilyl group. The reactive silicon group of the (meth)acrylic ester polymer (B) may be a trimethoxysilyl group. The polyoxyalkylene polymer (A) may have a terminal moiety represented by the following formula (2).

[Chem 1]

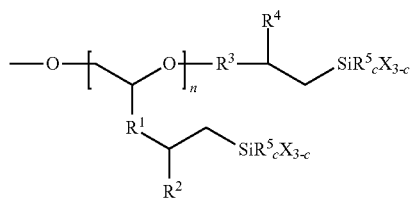

(2)

In this formula, $R^1$ and $R^3$ are each independently a divalent linkage group having 1 to 6 carbon atoms, the atoms of $R^1$ and $R^3$ that are bonded to carbon atoms adjacent respectively to $R^1$ and $R^3$ are each independently carbon, oxygen, or nitrogen, $R^2$ and $R^4$ are each independently hydrogen or a hydrocarbon group having 1 to 10 carbon atoms, n is an integer from 1 to 10, $R^5$ is a substituted or unsubstituted hydrocarbon group having 1 to 20 carbon atoms, X is a hydroxy group or a hydrolyzable group, and c is 0 or 1. $R^1$ may be $CH_2OCH_2$ and $R^3$ may be $CH_2$. $R^2$ and $R^4$ each may be hydrogen. The (meth)acrylic ester polymer (B) may be a polymer containing constituent monomers including: a monomer (b1) having a reactive silicon group and a polymerizable unsaturated group; and a macromonomer (b2) that is a (meth)acrylic ester polymer having a polymerizable unsaturated group.

One or more embodiments of the present invention further relate to a structural adhesive including the multi-part curable composition as defined above and a cured product obtained by curing the multi-part curable composition as defined above.

One or more embodiments of the present invention can provide a curable composition that can exhibit high stiffness by being subjected to a relatively short heating step and a cured product obtained by curing the composition.

DETAILED DESCRIPTION

Hereinafter, one or more embodiments of the present invention will be described specifically. One or more embodiments of the present invention are not limited to the embodiments described below.

The first aspect of one or more embodiments of the present invention is a multi-part curable composition including: an A part including a polyoxyalkylene polymer (A) having a reactive silicon group represented by the formula (1) given below, a (meth)acrylic ester polymer (B) having a reactive silicon group represented by the formula (1) given below, an epoxy resin curing agent (D) having a tertiary amine moiety and being other than alicyclic structure-containing amines, and an alicyclic structure-containing amine (E1); and a B part including an epoxy resin (C).

The second aspect of one or more embodiments of the present invention is a multi-part curable composition including: an A part including a polyoxyalkylene polymer (A) having a reactive silicon group represented by the formula (1) given below, a (meth)acrylic ester polymer (B) having a reactive silicon group represented by the formula (1) given below, and an epoxy resin curing agent (D) having a tertiary amine moiety and being other than amino alcohol compounds; and a B part including an epoxy resin (C), wherein either or both of the A and B parts include an amino alcohol compound (E2).

<<Polyoxyalkylene polymer (A) having reactive silicon group>>

<Reactive silicon group>

The polyoxyalkylene polymer (A) has a reactive silicon group represented by the following formula (1).

$$—SiR^5{}_cX_{3-c} \qquad (1)$$

In this formula, $R^5$ is a substituted or unsubstituted hydrocarbon group having 1 to 20 carbon atoms, X is a hydroxy group or a hydrolyzable group, and c is 0 or 1.

The number of carbon atoms in the hydrocarbon group represented by $R^5$ may be from 1 to 10, from 1 to 5, or from 1 to 3. Specific examples of $R^5$ include methyl, ethyl, chloromethyl, methoxymethyl, and N,N-diethylaminomethyl groups. $R^5$ may be a methyl group, an ethyl group, a chloromethyl group, or a methoxymethyl group or a methyl group or a methoxymethyl group.

Examples of X include a hydroxy group, halogens, and alkoxy, acyloxy, ketoximate, amino, amide, acid amide, aminooxy, mercapto, and alkenyloxy groups. Among these, alkoxy groups such as methoxy and ethoxy groups are more preferred in terms of moderate hydrolyzability and ease of handling. Particularly preferred are methoxy and ethoxy groups.

Specific examples of the reactive silicon group of the polyoxyalkylene polymer (A) include, but are not limited to, trimethoxysilyl, triethoxysilyl, tris(2-propenyloxy)silyl, triacetoxysilyl, dimethoxymethylsilyl, diethoxymethylsilyl, dimethoxyethylsilyl, (chloromethyl)dimethoxysilyl, (chloromethyl)diethoxysilyl, (methoxymethyl)dimethoxysilyl, (methoxymethyl)diethoxysilyl, (N,N-diethylaminomethyl)dimethoxysilyl, and (N,N-diethylaminomethyl)diethoxysilyl groups. Among these, dimethoxymethylsilyl, trimethoxysilyl, triethoxysilyl, (chloromethyl)dimethoxysilyl, (methoxymethyl)dimethoxysilyl, (methoxymethyl)diethoxysilyl, and (N,N-diethylaminomethyl)dimethoxysilyl groups are preferred since they exhibit high activity and allow for obtaining a cured product having good mechanical properties. In order to obtain a cured product having high stiffness, trimethoxysilyl and triethoxysilyl groups are more preferred, and a trimethoxysilyl group is even more preferred.

The polyoxyalkylene polymer (A) may have more than one reactive silicon groups on average per terminal moiety. Stating that the polyoxyalkylene polymer (A) has more than one reactive silicon groups on average per terminal moiety means that the polyoxyalkylene polymer (A) includes a polyoxyalkylene having two or more reactive silicon groups in one terminal moiety as represented by the formula (2) given below. The polyoxyalkylene polymer (A) may consist solely of a polyoxyalkylene having two or more reactive silicon groups in one terminal moiety or may include both a polyoxyalkylene having two or more reactive silicon groups in one terminal moiety and a polyoxyalkylene having one reactive silicon group in one terminal moiety. The terminal moieties of one polyoxyalkylene molecule may include both a terminal moiety having two or more reactive silicon groups and a terminal moiety having one reactive silicon group. The polyoxyalkylene polymer (A) may include a polyoxyalkylene having a terminal moiety having no reactive silicon group, although the polyoxyalkylene polymer (A) as a whole has more than one reactive silicon groups on average per terminal moiety.

[Chem 2]

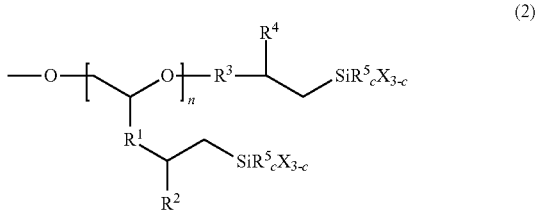

(2)

In this formula, $R^1$ and $R^3$ are each independently a divalent linkage group having 1 to 6 carbon atoms, the atoms of $R^1$ and $R^3$ that are bonded to carbon atoms adjacent respectively to $R^1$ and $R^3$ are each independently carbon, oxygen, or nitrogen, $R^2$ and $R^4$ are each independently hydrogen or a hydrocarbon group having 1 to 10 carbon atoms, n is an integer from 1 to 10, and $R^5$, X, and c are as defined above for the formula (1).

$R^1$ and $R^3$ may each independently be a divalent organic group having 1 to 6 carbon atoms or a hydrocarbon group optionally containing an oxygen atom. The number of carbon atoms in the hydrocarbon group may be from 1 to 4, from 1 to 3, or 1 or 2. Specific examples of $R^1$ include $CH_2OCH_2$, $CH_2O$, and $CH_2$, and $R^1$ may be $CH_2OCH_2$. Specific examples of $R^3$ include $CH_2$ and $CH_2CH_2$, and $R^3$ may be $CH_2$.

The number of carbon atoms in the hydrocarbon groups represented by $R^2$ and $R^4$ may be from 1 to 5, from 1 to 3, or 1 or 2. Specific examples of $R^2$ and $R^4$ include a hydrogen atom, a methyl group, and an ethyl group, and $R^2$ and $R^4$ may be hydrogen atoms or methyl groups or hydrogen atoms.

In a particularly preferred embodiment, the terminal moiety represented by the formula (2) contains $CH_2OCH_2$ as $R^1$, $CH_2$ as $R^3$, and hydrogen atoms as $R^2$ and $R^4$. The integer n may be from 1 to 5, from 1 to 3, or 1 or 2. It should be noted that n is not limited to one value and terminal moieties having different values of n may be present.

In the polyoxyalkylene polymer (A), the number of reactive silicon groups may be more than 1.0, 1.1 or more, 1.5 or more, or 2.0 or more on average per terminal moiety. The average number may be 5 or less or 3 or less.

In the polyoxyalkylene polymer (A), the number of terminal moieties having more than one reactive silicon groups may be 0.5 or more, 1.0 or more, 1.1 or more, or 1.5 or more on average per molecule. The average number may be 4 or less or 3 or less.

The polyoxyalkylene polymer (A) may include a reactive silicon group other than those in the terminal moieties. However, it is preferable that the polyoxyalkylene polymer (A) should include reactive silicon groups only in the terminal moieties, because in this case a rubbery cured product that exhibits a high degree of elongation and a low elastic modulus is likely to be obtained.

In the polyoxyalkylene polymer (A), the average number of reactive silicon groups per molecule may be more than 1.0, 1.2 or more, 1.3 or more, 1.5 or more, or 1.7 or more. The average number may be 6.0 or less, 5.5 or less, or 5.0 or less. If the average number of reactive silicon groups per molecule is 1.0 or less, this could lead to a failure to obtain a cured product having high strength. If the average number of reactive silicon groups per molecule is more than 6.0, this could lead to a failure to obtain a cured product that exhibits a high degree of elongation.

<Main Chain Structure>

The polyoxyalkylene polymer (A) is not limited to having a particular backbone chain, and examples of the backbone chain of the polyoxyalkylene polymer (A) include polyoxyethylene, polyoxypropylene, polyoxybutylene, polyoxytetramethylene, polyoxyethylene-polyoxypropylene copolymer, and polyoxypropylene-polyoxybutylene copolymer. Among these, polyoxypropylene is preferred.

The number-average molecular weight of the polyoxyalkylene polymer (A), as determined by GPC as a polystyrene equivalent molecular weight, may be from 3,000 to 100,000, from 3,000 to 50,000, or from 3,000 to 30,000. If the number-average molecular weight is less than 3,000, the amount of introduced reactive silicon groups is large, and this could be disadvantageous in terms of production cost. If the number-average molecular weight is more than 100,000, the polymer has a high viscosity, which tends to be disadvantageous in terms of workability.

The molecular weight of the polyoxyalkylene polymer (A) can be expressed also as a terminal group equivalent molecular weight. The terminal group equivalent molecular weight is determined as follows: before introduction of reactive silicon groups, an organic polymer precursor is subjected to titration analysis based on the principles of the hydroxy value measurement method as specified in JIS K 1557 and the iodine value measurement method as specified in JIS K 0070 to directly measure the terminal group concentration, based on which the terminal group equivalent molecular weight is calculated taking into account the architecture of the organic polymer (in particular, the degree of branching which depends on the polymerization initiator used). The terminal group equivalent molecular weight of the polyoxyalkylene polymer (A) can be determined also by creating a calibration curve representing the relationship between the number-average molecular weight of the organic polymer precursor as determined by common GPC analysis and the terminal group equivalent molecular weight, determining the number-average molecular weight of the polyoxyalkylene polymer (A) by GPC, and converting the determined number-average molecular weight to the terminal group equivalent molecular weight based on the calibration curve.

The polyoxyalkylene polymer (A) is not limited to having a particular molecular weight distribution (Mw/Mn), but may have a narrow molecular weight distribution. To be specific, the polydispersity index Mw/Mn may be less than 2.0 1.6 or less, 1.5 or less, or 1.4 or less. In order to improve various mechanical properties such as the durability and the degree of elongation of the cured product, the polydispersity index Mw/Mn may be 1.2 or less. The molecular weight distribution of the polyoxyalkylene polymer (A) can be determined from the number-average molecular weight and weight-average molecular weight obtained by GPC analysis.

The main chain structure of the polyoxyalkylene polymer (A) may be linear or branched.

<Method of Synthesizing Polyoxyalkylene Polymer (A)>

Hereinafter, how to synthesize the polyoxyalkylene polymer (A) will be described.

A preferred polyoxyalkylene polymer (A) having more than 1.0 reactive silicon groups on average per terminal moiety may be obtained by introducing two or more unsaturated carbon-carbon bonds into one terminal moiety of a hydroxy-terminated polymer resulting from polymerization and then reacting a reactive silicon group-containing compound with the introduced unsaturated carbon-carbon bonds. The following describes this preferred synthesis method.

(Polymerization)

The synthesis of the polyoxyalkylene polymer (A) may be carried out using a method in which an epoxy compound is polymerized with a hydroxy group-containing initiator in the presence of a double metal cyanide complex catalyst such as zinc hexacyanocobaltate-glyme complex.

Examples of the hydroxy group-containing initiator include compounds containing one or more hydroxy groups, such as ethylene glycol, propylene glycol, glycerin, pentaerythritol, low-molecular-weight polyoxypropylene glycol, polyoxypropylene triol, allyl alcohol, polyoxypropylene monoallyl ether, and polyoxypropylene monoalkyl ether.

Examples of the epoxy compound include alkylene oxides such as ethylene oxide and propylene oxide and glycidyl ethers such as methyl glycidyl ether and allyl glycidyl ether. Among these, propylene oxide is preferred.

(Introduction of Unsaturated Carbon-Carbon Bonds)

The introduction of two or more unsaturated carbon-carbon bonds into one terminal moiety may be accomplished using a method in which an alkali metal salt is allowed to act on the hydroxy-terminated polymer and thereafter the polymer is reacted first with an unsaturated carbon-carbon bond-containing epoxy compound and then with an unsaturated carbon-carbon bond-containing halogenated hydrocarbon compound. With the use of this method, the molecular weight and molecular weight distribution of the polymer main chain can be controlled depending on the polymerization conditions, and at the same time the reactive groups can be introduced efficiently and reliably.

The alkali metal salt may be sodium hydroxide, sodium methoxide, sodium ethoxide, potassium hydroxide, potassium methoxide, or potassium ethoxide or sodium methoxide or potassium methoxide. Sodium methoxide is particularly preferred in terms of availability.

The temperature at which the alkali metal salt is allowed to act on the hydroxy-terminated polymer may be from 50 to 150° C. or from 110 to 140° C. The time for which the alkali metal salt is allowed to act on the hydroxy-terminated polymer may be from 10 minutes to 5 hours or from 30 minutes to 3 hours.

A compound represented by the following formula (3) is particularly suitable for use as the unsaturated carbon-carbon bond-containing epoxy compound ($R^1$ and $R^2$ in the formula are as defined above).

[Chem 3]

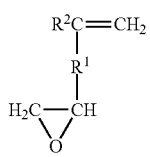

(3)

Specifically, allyl glycidyl ether, methallyl glycidyl ether, glycidyl acrylate, glycidyl methacrylate, butadiene monoxide, and 1,4-cyclopentadiene monoepoxide are preferred in terms of reaction activity, and allyl glycidyl ether is particularly preferred.

The amount of the unsaturated carbon-carbon bond-containing epoxy compound to be added can be freely chosen taking into account the amount of the unsaturated carbon-carbon bonds to be introduced into the polymer and the reactivity of the epoxy compound with the polymer. In particular, the molar ratio of the epoxy compound to the hydroxy groups of the hydroxy-terminated polymer may be 0.2 or more or 0.5 or more. The molar ratio may be 5.0 or less or 2.0 or less.

The reaction temperature at which the hydroxy group-containing polymer is subjected to a ring-opening addition reaction with the unsaturated carbon-carbon bond-containing epoxy compound may be from 60 to 150° C. or from 110 to 140° C.

Examples of the unsaturated carbon-carbon bond-containing halogenated hydrocarbon compound include vinyl chloride, allyl chloride, methallyl chloride, vinyl bromide, allyl bromide, methallyl bromide, vinyl iodide, allyl iodide, and methallyl iodide. In terms of ease of handling, it is more preferable to use allyl chloride or methallyl chloride.

The amount of the unsaturated carbon-carbon bond-containing halogenated hydrocarbon compound to be added is not limited to a particular range. The molar ratio of the halogenated compound to the hydroxy groups of the hydroxy-terminated polymer may be 0.7 or more or 1.0 or more. The molar ratio may be 5.0 or less or 2.0 or less.

The temperature at which the unsaturated carbon-carbon bond-containing halogenated hydrocarbon compound is reacted with the hydroxy-terminated polymer may be from 50 to 150° C. or from 110 to 140° C. The reaction time may be from 10 minutes to 5 hours or from 30 minutes to 3 hours.

(Introduction of Reactive Silicon Groups)

The method of introducing reactive silicon groups is not limited to a particular technique, and known methods can be used. The following are examples of the introduction method.

(i) Method in which a hydrosilane compound is added to an unsaturated carbon-carbon bond-containing polymer by a hydrosilylation reaction.

(ii) Method in which an unsaturated carbon-carbon bond-containing polymer is reacted with a compound having both a group capable of reacting with the unsaturated carbon-carbon bond to form a bond and a reactive silicon group (this compound is also referred to as a silane coupling agent). For example, the group capable of reacting with the unsaturated carbon-carbon bond to form a bond is, but not limited to, a mercapto group.

(iii) Method in which a reactive group-containing polymer is reacted with a silane coupling agent. Examples of the combination of the reactive group of the reactive group-containing polymer and the reactive group of the silane coupling agent include, but are not limited to, a combination of a hydroxy group and an isocyanate group, a combination of a hydroxy group and an epoxy group, a combination of an amino group and an isocyanate group, a combination of an amino group and a thioisocyanate group, a combination of an amino group and an epoxy group, a combination of an amino group and an α,β-unsaturated carbonyl group (Michael addition reaction), a combination of a carboxy group and an epoxy group, and a combination of an unsaturated bond and a mercapto group.

The method (i) is preferred since the reaction is easy to conduct, the amount of the reactive silicon groups to be introduced can be adjusted, and the resulting reactive silicon group-containing polyoxyalkylene polymer (A) has stable physical properties. The methods (ii) and (iii) are preferred since these methods permit a wide choice of reactions and allow the degree of reactive silicon group introduction to be easily increased.

Examples of the hydrosilane compound that can be used in the method (i) include, but are not limited to, trimethoxysilane, triethoxysilane, tris(2-propenyloxy)silane, triacetoxysilane, dimethoxymethylsilane, diethoxymethylsilane, dimethoxyethylsilane, (chloromethyl)dimethoxysilane, (chloromethyl)diethoxysilane, (methoxymethyl)dimethoxysilane, (methoxymethyl)diethoxysilane, (N,N-diethylaminomethyl)dimethoxysilane, and (N,N-diethylaminomethyl)diethoxysilane.

As for the amount of the hydrosilane compound used, the molar ratio of the compound to the unsaturated carbon-carbon bonds of the precursor polymer (the number of moles of hydrosilane/the number of moles of unsaturated carbon-carbon bonds) may be from 0.05 to 10 in terms of reactivity or from 0.3 to 2 in terms of economy.

The hydrosilylation reaction can be accelerated by using a catalyst. The hydrosilylation catalyst used may be any of known catalysts such as various complexes of cobalt, nickel, iridium, platinum, palladium, rhodium, and ruthenium. Examples of the catalyst that can be used include: platinum supported on a support such as alumina, silica, or carbon black; chloroplatinic acid; a chloroplatinic acid complex composed of chloroplatinic acid and another compound such as an alcohol, an aldehyde, or a ketone; platinum-olefin complexes such as $Pt(CH_2=CH_2)_2(PPh_3)$ and $Pt(CH_2=CH_2)_2Cl_2$; platinum-vinyl siloxane complexes such as $Pt\{(vinyl)Me_2SiOSiMe_2(vinyl)\}$ and $Pt\{Me(vinyl)SiO\}_4$; platinum-phosphine complexes such as $Pt(PPh_3)_4$ and $Pt(PBu_3)_4$; and platinum-phosphite complexes such as $Pt\{P(OPh)_3\}_4$. The use of a platinum catalyst such as chloroplatinic acid or a platinum-vinyl siloxane complex is preferred in terms of reaction efficiency.

Examples of the silane coupling agent that can be used in the method (ii) or (iii) include: mercaptosilanes reactive with unsaturated bonds, such as 3-mercaptopropyltrimethoxysilane, 3-mercaptopropyldimethoxymethylsilane, 3-mercaptopropyltriethoxysilane, mercaptomethyltriethoxysilane, and mercaptomethyldimethoxymethylsilane; isocyanatosilanes reactive with hydroxy groups, such as 3-isocyanatopropyltrimethoxysilane, 3-isocyanatopropyldimethoxymethylsilane, 3-isocyanatopropyltriethoxysilane, isocyanatomethyltrimethoxysilane, isocyanatomethyltriethoxysilane, and isocyanatomethyldimethoxymethylsilane; epoxysilanes reactive with hydroxy, amino, or carboxy groups, such as 3-glycidoxypropyltrimethoxysilane, 3-glycidoxypropyldimethoxymethylsilane, 3-glycidoxypropyltriethoxysilane, glycidoxymethyltrimethoxysilane, glycidoxymethyltriethoxysilane, and glycidoxymethyldimethoxymethylsilane; aminosilanes reactive with isocyanate or thioisocyanate groups, such as 3-aminopropyltrimethoxysilane, 3-aminopropyldimethoxymethylsilane, 3-aminopropyltriethoxysilane, 3-(2-aminoethyl)propyltrimethoxysilane, 3-(2-aminoethyl)propyldimethoxymethylsilane, 3-(2-aminoethyl)propyltriethoxysilane, 3-(N-ethylamino)-2-methylpropyltrimethoxysilane, 3-ureidopropyltrimethoxysilane, 3-ureidopropyltriethoxysilane, N-phenyl-3-aminopropyltrimethoxysilane, N-benzyl-3-aminopropyltrimethoxysilane, N-cyclohexylaminomethyltriethoxysilane, N-cyclohexylaminomethyldiethoxymethylsilane, N-phenylaminomethyltrimethoxysilane, (2-aminoethyl)aminomethyltrimethoxysilane, N,N'-bis[3-(trimethoxysilyl)propyl]ethylenediamine, and bis(3-(trimethoxysilyl)propyl)amine; and hydroxyalkylsilanes such as 3-hydroxypropyltrimethoxysilane and hydroxymethyltriethoxysilane.

The main chain of the polyoxyalkylene polymer (A) may include an ester bond or an amide segment represented by the following formula (4) insofar as the effect of one or more embodiments of the present invention is not impaired.

$$—NR^6—C(=O)—\qquad(4)$$

In this formula, $R^6$ is an organic group having 1 to 10 carbon atoms or a hydrogen atom.

A cured product obtained from a curable composition including the polyoxyalkylene polymer (A) containing an ester bond or an amide segment can have high hardness and high strength thanks to the action of hydrogen bonds. However, the polyoxyalkylene polymer (A) containing an amide segment could be cleaved due to heat or any other cause. Additionally, the curable composition including the polyoxyalkylene polymer (A) containing an amide segment tends to have a high viscosity. In view of the above advantages and disadvantages, a polyoxyalkylene containing an amide segment may be used as the polyoxyalkylene polymer (A), or a polyoxyalkylene free of any amide segment may be used as the polymer (A).

Examples of the amide segment represented by the formula (4) include an amide segment formed by a reaction between an isocyanate group and a hydroxy group, an amide segment formed by a reaction between an amino group and a carbonate, an amide segment formed by a reaction between an isocyanate group and an amino group, and an amide segment formed by a reaction between an isocyanate group and a mercapto group. A segment formed by a reaction between an amide segment containing an activated hydrogen atom and an isocyanate group is also categorized as the amide segment represented by the formula (4).

An example of the method of producing the amide segment-containing polyoxyalkylene polymer (A) is a method in which a polyoxyalkylene terminated by an activated hydrogen-containing group is reacted with an excess amount of polyisocyanate compound to synthesize a polymer terminated by an isocyanate group and after or simultaneously with the synthesis, the Z group of a silicon compound represented by the following formula (5) is reacted with all or part of the isocyanate groups of the synthesized polymer.

$$Z—R^7—SiR^5_cX_{3-c}\qquad(5)$$

In this formula, $R^5$, X, and c are as defined above, $R^7$ is a divalent organic group and preferably a divalent hydrocarbon group having 1 to 20 carbon atoms, Z is a hydroxy, carboxy, mercapto, or primary or secondary amino group.

Examples of the silicon compound represented by the formula (5) include, but are not limited to: amino group-containing silanes such as γ-aminopropyldimethoxymethylsilane, γ-aminopropyltrimethoxysilane, N-((3-aminoethyl)-γ-aminopropyltrimethoxysilane, N-(β-aminoethyl)-γ-aminopropyldimethoxymethylsilane, (N-phenyl)-γ-aminopropyltrimethoxysilane, and N-ethylaminoisobutyltrimethoxysilane; hydroxy group-containing silanes such as γ-hydroxypropyltrimethoxysilane; and mercapto group-containing silanes such as γ-mercaptopropyltrimethoxysilane and mercaptomethyltriethoxysilane. Additionally, as described in Japanese Laid-Open Patent Application Publication No. H6-211879 (U.S. Pat. No. 5,364,955), Japanese Laid-Open Patent Application Publication No. H10-53637 (U.S. Pat. No. 5,756,751), Japanese Laid-Open Patent Application Publication No. H10-204144 (EP 0831108), Japanese Laid-Open Patent Application Publication No. 2000-169544, and Japanese Laid-Open Patent Application Publication No. 2000-169545, a product of a Michael addition reaction between any of various α,β-unsaturated carbonyl compounds and any of various primary amino group-containing silanes or a product of a Michael addition reaction between any of various (meth)acryloyl group-containing silanes and any of various primary amino group-containing compounds can also be used as the silicon compound represented by the formula (5).

Another example of the method of producing the amide segment-containing polyoxyalkylene polymer (A) is a method in which a polyoxyalkylene terminated by an activated hydrogen-containing group is reacted with a reactive silicon group-containing isocyanate compound represented by the following formula (6).

$$O=C=N-R^7-SiR^5_cX_{3-c} \quad (6)$$

In this formula, $R^7$, $R^5$, X, and c are as defined above.

Examples of the reactive silicon group-containing isocyanate compound represented by the formula (6) include, but are not limited to, γ-trimethoxysilylpropyl isocyanate, γ-triethoxysilylpropyl isocyanate, γ-methyldimethoxysilylpropyl isocyanate, γ-methyldiethoxysilylpropyl isocyanate, γ-(methoxymethyl)dimethoxysilylpropyl isocyanate, trimethoxysilylmethyl isocyanate, triethoxymethylsilylmethyl isocyanate, dimethoxymethylsilylmethyl isocyanate, diethoxymethylsilylmethyl isocyanate, and (methoxymethyl)dimethoxysilylmethyl isocyanate.

In the case where the polyoxyalkylene polymer (A) contains amide segments, the number of the amide segments per molecule of the polyoxyalkylene polymer (A) (the average number of the amide segments) may be from 1 to 10, from 1.5 to 5, or from 2 to 3. If the average number of the amide segments is less than 1, this could lead to insufficient curability. If the average number is more than 10, the polyoxyalkylene polymer (A) could have a high viscosity and be difficult to handle. In order to reduce the viscosity of the curable composition and improve the workability of the curable composition, it is preferable for the polyoxyalkylene polymer (A) to be free of any amide segment.

<<Reactive Silicon Group-Containing (Meth)acrylic Ester Polymer (B)>>

The (meth)acrylic ester monomer for forming the main chain of the reactive silicon group-containing (meth)acrylic ester polymer (B) (hereinafter also referred to as "(meth) acrylic ester polymer (B)") is not limited to a particular type, and various monomers can be used. Specific examples include (meth)acrylic monomers such as methyl (meth) acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth) acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth) acrylate, dodecyl (meth)acrylate, phenyl (meth)acrylate, toluyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, (3-trimethoxysilyl)propyl (meth)acrylate, (3-dimethoxymethylsilyl)propyl (meth)acrylate, (2-trimethoxysilyl)ethyl (meth)acrylate, (2-dimethoxymethylsilyl)ethyl (meth)acrylate, trimethoxysilylmethyl (meth)acrylate, (dimethoxymethylsilyl)methyl (meth)acrylate, an ethylene oxide adduct of (meth)acrylic acid, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, perfluoroethyl (meth)acrylate, trifluoromethyl (meth)acrylate, bis(trifluoromethyl)methyl (meth) acrylate, 2-trifluoromethyl-2-perfluoroethylethyl (meth) acrylate, 2-perfluorohexylethyl (meth)acrylate, 2-perfluorodecylethyl (meth)acrylate, and 2-perfluorohexadecylethyl (meth)acrylate.

Examples of monomers other than those mentioned above include: acrylic acids such as acrylic acid and methacrylic acid; amide group-containing monomers such as N-methylolacrylamide and N-methylolmethacrylamide; epoxy group-containing monomers such as glycidyl acrylate and glycidyl methacrylate; and monomers containing a nitrogen-containing group such as diethylaminoethyl acrylate and diethylaminoethyl methacrylate.

The (meth)acrylic ester polymer (B) used may be a polymer resulting from copolymerization of a (meth)acrylic ester monomer and a vinyl monomer copolymerizable with the (meth)acrylic ester monomer. The vinyl monomer is not limited to a particular type, and examples of the vinyl monomer include: styrene monomers such as styrene, vinyltoluene, α-methylstyrene, chlorostyrene, styrenesulfonic acid, and salts of styrenesulfonic acid; fluorine-containing vinyl monomers such as perfluoroethylene, perfluoropropylene, and vinylidene fluoride; silicon-containing vinyl monomers such as vinyltrimethoxysilane and vinyltriethoxysilane; maleic monomers such as maleic anhydride, maleic acid, and monoalkyl and dialkyl esters of maleic acid; fumaric monomers such as fumaric acid and monoalkyl and dialkyl esters of fumaric acid; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide; nitrile group-containing vinyl monomers such as acrylonitrile and methacrylonitrile; amide group-containing vinyl monomers such as acrylamide and methacrylamide; vinyl ester monomers such as vinyl acetate, vinyl propionate, vinyl pivalate, vinyl benzoate, and vinyl cinnamate; alkenyl monomers such as ethylene and propylene; conjugated diene monomers such as butadiene and isoprene; vinyl chloride; vinylidene chloride; allyl chloride; and allyl alcohol. Two or more of these may be used as copolymerization components.

Among (meth)acrylic ester polymers obtained using the monomers mentioned above, a copolymer formed from (meth)acrylic ester monomers and optionally a styrene monomer is preferred due to its superiority in physical properties. A (meth)acrylic ester polymer formed from an acrylic ester monomer and a methacrylic ester monomer is more preferred, and an acrylic ester polymer formed from acrylic ester monomers is particularly preferred.

The (meth)acrylic ester polymer (B) has a reactive silicon group represented by the formula (1) given above. The reactive silicon group of the (meth)acrylic ester polymer (B) may be the same or different from the reactive silicon group of the polyoxyalkylene polymer (A).

Specific examples of $R^5$ include methyl, ethyl, chloromethyl, methoxymethyl, and N,N-diethylaminomethyl groups. Preferred are methyl and ethyl groups.

Examples of X include a hydroxy group, hydrogen, halogens, and alkoxy, acyloxy, ketoximate, amino, amide, acid amide, aminooxy, mercapto, and alkenyloxy groups. Among these, alkoxy groups such as methoxy and ethoxy groups are more preferred in terms of moderate hydrolyzability and ease of handling. Particularly preferred are methoxy and ethoxy groups.

Specific examples of the reactive silicon group of the (meth)acrylic ester polymer (B) include, but are not limited to, trimethoxysilyl, triethoxysilyl, tris(2-propenyloxy)silyl, triacetoxysilyl, dimethoxymethylsilyl, diethoxymethylsilyl, dimethoxyethylsilyl, (chloromethyl)dimethoxysilyl, (chloromethyl)diethoxysilyl, (methoxymethyl)dimethoxysilyl, (methoxymethyl)diethoxysilyl, (N,N-diethylaminomethyl)dimethoxysilyl, and (N,N-diethylaminomethyl)diethoxysilyl groups. Among these, dimethoxymethylsilyl, trimethoxysilyl, triethoxysilyl, (chloromethyl)dimethoxysilyl, (methoxymethyl)dimethoxysilyl, (methoxymethyl)diethoxysilyl, and (N,N-diethylaminomethyl)dimethoxysilyl groups are preferred since they exhibit high activity and allow for obtaining a cured product having good mechanical properties. In order to obtain a cured product having a high Young's modulus, trimethoxysilyl and triethoxysilyl groups are more preferred, and a trimethoxysilyl group is even more preferred.

The reactive silicon group content of the (meth)acrylic ester polymer (B) is not limited to a particular range, but is preferably 0.1 mmol/g or more, more preferably 0.5 mmol/g or more, and even more preferably 0.6 mmol/g or more. The reactive silicon group content may be 2.0 mmol/g or less. In order to prevent a decrease in the degree of elongation of the resulting cured product, the reactive silicon group content may be 1.0 mmol/g or less. In order to obtain a high-stiffness cured product having a high Young's modulus, the reactive silicon group content may be from 0.6 to 1.0 mmol/g.

The method of introducing reactive silicon groups into the (meth)acrylic ester polymer is not limited to a particular technique. For example, the methods listed below can be used.

(iv) A method in which a compound having a polymerizable unsaturated group and a reactive silicon group is copolymerized with the monomer as described above. With this method, the reactive silicon groups tend to be randomly introduced into the polymer main chain.

(v) A method in which a (meth)acrylic ester polymer is produced by polymerization using a mercaptosilane compound containing a reactive silicon group as a chain transfer agent. With this method, the reactive silicon groups can be introduced into the ends of the polymer.

(vi) A method in which a compound having a polymerizable unsaturated group and a reactive functional group (V group) is copolymerized and then the resulting copolymer is reacted with a compound having a reactive silicon group and a functional group reactive with the V group. Specific examples of the method (vi) include: a method in which 2-hydroxyethyl acrylate is copolymerized and then the resulting copolymer is reacted with an isocyanatosilane having a reactive silicon group; and a method in which glycidyl acrylate is copolymerized and then the resulting copolymer is reacted with an aminosilane compound having a reactive silicon group.

(vii) A method in which terminal functional groups of a (meth)acrylic ester polymer synthesized by living radical polymerization are modified to introduce reactive silicon groups into the polymer. A (meth)acrylic ester polymer resulting from living radical polymerization permits easy introduction of functional groups into the ends of the polymer. The reactive silicon groups can be introduced into the ends of the polymer by modifying the introduced functional groups.

The following describes examples of silicon compounds that can be used to introduce reactive silicon groups into the (meth)acrylic ester polymer (B) by any of the above methods. Examples of the compound used in the method (iv) and having a polymerizable unsaturated group and a reactive silicon group include 3-(dimethoxymethylsilyl)propyl (meth)acrylate, 3-(trimethoxysilyl)propyl (meth)acrylate, 3-(triethoxysilyl)propyl (meth)acrylate, (dimethoxymethylsilyl)methyl (meth)acrylate, (trimethoxysilyl)methyl (meth) acrylate, (triethoxysilyl)methyl (meth)acrylate, and 3-((methoxymethyl)dimethoxysilyl)propyl (meth)acrylate.

In terms of availability, 3-(dimethoxymethylsilyl)propyl (meth)acrylate and 3-(trimethoxysilyl)propyl (meth)acrylate are particularly preferred.

Examples of the mercaptosilane compound used in the method (v) and having a reactive silicon group include 3-mercaptopropyldimethoxymethylsilane, 3-mercaptopropyltrimethoxysilane, (mercaptomethyl)dimethoxymethylsilane, and (mercaptomethyl)trimethoxysilane.

Examples of the compound used in the method (vi) and having a reactive silicon group and a functional group reactive with the V group include: isocyanatosilane compounds such as 3-isocyanatopropyldimethoxymethylsilane, 3-isocyanatopropyltrimethoxysilane, 3-isocyanatopropyltriethoxysilane, isocyanatomethyldimethoxymethylsilane, isocyanatomethyltrimethoxysilane, and isocyanatomethyltriethoxysilane; epoxysilane compounds such as 3-glycidoxypropyldimethoxymethylsilane, 3-glycidoxypropyltrimethoxysilane, 3-glycidoxypropyltriethoxysilane, glycidoxymethyltrimethoxysilane, glycidoxymethyldimethoxymethylsilane, and glycidoxymethyltriethoxysilane; and aminosilane compounds such as 3-aminopropyldimethoxymethylsilane, 3-aminopropyltrimethoxysilane, 3-aminopropyltriethoxysilane, aminomethyldimethoxymethylsilane, aminomethyltrimethoxysilane, aminomethyltriethoxysilane, N-cyclohexylaminomethyldimethoxymethylsilane, N-cyclohexylaminomethyltrimethoxysilane, and N-cyclohexylaminomethyltriethoxysilane.

In the method (vii), any modification reaction can be used. Examples of the modification reaction method include: a method using a compound having a reactive silicon group and a functional group reactive with the terminal reactive group resulting from polymerization; and a method in which double bonds are introduced into the ends of the polymer using a compound having a double bond and a functional group reactive with the terminal reactive group and subsequently reactive silicon groups are introduced into the ends of the polymer through a process such as hydrosilylation.

The methods described above may be used in any combination. For example, the combined use of the methods (vi) and (v) can result in a (meth)acrylic ester polymer (B) having reactive silicon groups both at molecular chain ends and in side chains.

In order to achieve high stiffness of the cured product, the (meth)acrylic ester polymer (B) may include a polymer containing 40% by weight or more of an alkyl (meth) acrylate having an alkyl having 1 to 3 carbon atoms in the total monomers. The (meth)acrylic ester polymer (B) may consist solely of the polymer containing 40% by weight or more of an alkyl (meth)acrylate having an alkyl having 1 to 3 carbon atoms in the total monomers. In order to increase the stiffness, the degree of elongation, and the strength of the cured product, the (meth)acrylic ester polymer (B) may include not only such an alkyl (meth)acrylate polymer but also a polymer containing 40% by weight or more of an alkyl (meth)acrylate having an alkyl having 4 to 30 carbon atoms in the total monomers and may be prepared by mixing the two different polymers.

It is also preferable that the (meth)acrylic ester polymer (B) should include a polymer resulting from copolymerization of a monomer mixture containing 40% by weight or more of an alkyl (meth)acrylate having and alkyl having 1 to 3 carbon atoms in the total monomers and 40% by weight or more of an alkyl (meth)acrylate having an alkyl having 4 to 30 carbon atoms in the total monomers, because also in this case the stiffness, the degree of elongation, and the strength of the cured product can be increased.

Hereinafter, a (meth)acrylic ester polymer (B) produced by polymerization using a macromonomer will be described as a preferred embodiment of the (meth)acrylic ester polymer (B).

The (meth)acrylic ester polymer (B) produced by polymerization using a macromonomer is a polymer containing constituent monomers including a monomer (b1) having a reactive silicon group represented by the formula (1) given above and a polymerizable unsaturated group and a macromonomer (b2) that is a (meth)acrylic ester polymer having a polymerizable unsaturated group. The constituent monomers of the polymer may further include an alkyl (meth)acrylate (b3) having an alkyl having 1 to 3 carbon atoms. As used herein, the term "(meth)acryl" means "acryl and/or methacryl".

(Monomer (b1) Having Reactive Silicon Group and Polymerizable Unsaturated Group)

Examples of the monomer (b1) having a reactive silicon group and a polymerizable unsaturated group include: compounds having a (meth)acryloxy group and a reactive silicon group, such as 3-(meth)acryloxypropyltrimethoxysilane, 3-(meth)acryloxypropyltriethoxysilane, 3-(meth)acryloxypropyldimethoxymethylsilane, (meth)acryloxymethyltrimethoxysilane, and (meth)acryloxymethyldimethoxymethylsilane; and compounds having a vinyl group and a reactive silicon group, such as vinyltrimethoxysilane and vinyltriethoxysilane. One of these compounds may be used alone, or two or more thereof may be used in combination.

The content of the monomer (b1) having a reactive silicon group and a polymerizable unsaturated group or the total content of the monomers (b1) may be from 0.1 to 50% by weight, from 0.5 to 30% by weight, or from 1 to 20% by weight based on the total monomers constituting the (meth)acrylic ester polymer (B) produced by polymerization using the macromonomer (b2).

(Macromonomer (b2))

The macromonomer (b2) is a (meth)acrylic ester polymer having a polymerizable unsaturated group. Although being a polymer in itself, the macromonomer (b2) can, by virtue of the polymerizable unsaturated group, be copolymerized with the monomer (b1) having a reactive silicon group and a polymerizable unsaturated group and serves as a constituent monomer of the (meth)acrylic ester polymer (B).

The backbone chain of the macromonomer (b2) is a (meth)acrylic ester polymer. The monomer for forming the backbone chain of the macromonomer (b3) is not limited to a particular type, and various monomers can be used. Examples of (meth)acrylic monomers include (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, stearyl (meth)acrylate, phenyl (meth)acrylate, toluyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, an ethylene oxide adduct of (meth)acrylic acid, 2,2,2-trifluoroethyl (meth)acrylate, 3,3,3-trifluoropropyl (meth)acrylate, 3,3,4,4,4-pentafluorobutyl (meth)acrylate, 2-perfluoroethyl-2-perfluorobutylethyl (meth)acrylate, trifluoromethyl (meth)acrylate, perfluoroethyl (meth)acrylate, bis(trifluoromethyl)methyl (meth)acrylate, 2-trifluoromethyl-2-perfluoroethylethyl (meth)acrylate, 2-perfluorohexylethyl (meth)acrylate, 2-perfluorodecylethyl (meth)acrylate, 2-perfluorohexadecylethyl (meth)acrylate, dimethylaminoethyl (meth)acrylate, chloroethyl (meth)acrylate, tetrahydrofurfuryl (meth)acrylate, glycidyl (meth)acrylate, and 2-aminoethyl (meth)acrylate.

Another monomer copolymerizable with the (meth)acrylic monomer as mentioned above may also be used. Examples of the other monomer include: styrene monomers such as styrene, vinyltoluene, α-methylstyrene, chlorostyrene, and styrenesulfonic acid; fluorine-containing vinyl monomers such as perfluoroethylene, perfluoropropylene, and vinylidene fluoride; maleic acid; maleic acid derivatives such as maleic anhydride, monoalkyl maleates, and dialkyl maleates; fumaric acid; fumaric acid derivatives such as monoalkyl fumarates and dialkyl fumarates; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide; vinyl ester monomers such as vinyl acetate, vinyl propionate, vinyl pivalate, vinyl benzoate, and vinyl cinnamate; olefin monomers such as ethylene and propylene; conjugated diene monomers such as butadiene and isoprene; (meth)acrylamide; (meth)acrylonitrile; and vinyl monomers such as vinyl chloride, vinylidene chloride, allyl chloride, allyl alcohol, ethyl vinyl ether, and butyl vinyl ether. One of these monomers may be used alone, or two or more thereof may be used in combination.

The macromonomer (b2) exhibits polymerizability by virtue of having a polymerizable unsaturated group. In the macromonomer (b2), the polymerizable unsaturated group may be introduced into either molecular chain ends or side chains of the (meth)acrylic ester polymer. In terms of bonding performance, the polymerizable unsaturated group may be introduced into the molecular chain ends.

The polymerizable unsaturated group of the macromonomer (b2) is not limited to a particular type, and may be any polymerizable unsaturated group that exhibits polymerizability in common radical polymerization. Examples of the polymerizable unsaturated group include acryloyl, methacryloyl, vinyl, allyl, and methallyl groups. Acryloyl and methacryloyl groups are preferred because they exhibit high polymerizability.

The method of introducing the polymerizable unsaturated group into the macromonomer (b2) is not limited to a particular technique. For example, the methods (viii) to (x) listed below can be used.

(viii) A method in which a monomer having two kinds of polymerizable unsaturated groups differing in reactivity (an example of this monomer is allyl acrylate) is copolymerized with another monomer having a (meth)acrylic structure.

(ix) A method in which a compound having a polymerizable unsaturated group and a reactive functional group (Z group) (examples of this compound include acrylic acid and 2-hydroxyethyl acrylate) is copolymerized with another monomer having a (meth)acrylic structure and then the resulting copolymer is reacted with a compound having a polymerizable unsaturated group and a functional group reactive with the Z group (examples of this compound include diethyl isocyanate (meth)acrylate).

(x) A method in which a monomer having a (meth)acrylic structure is polymerized by living radical polymerization and then polymerizable unsaturated groups are introduced into the molecular chain ends of the resulting polymer.

These methods may be used in any combination.

Among the methods, the method (x) is preferred because with this method polymerizable unsaturated groups can be introduced into the molecular chain ends. Examples of the "living radical polymerization" include: living radical polymerization using a cobalt porphyrin complex as taught in Journal of the American Chemical Society (J. Am. Chem. Soc.), 1994, vol. 116, p. 7943; living radical polymerization using nitroxide radicals as taught in Japanese Laid-Open Patent Application Publication (Translation of PCT Application) No. 2003-500378; and atom-transfer radical polymerization (ATRP) using an organic halide or a halogenated sulfonyl compound as an initiator and a transition metal complex as a catalyst as taught in Japanese Laid-Open Patent Application Publication No. H11-130931. The atom-transfer radical polymerization is most preferred because with this polymerization the polymerizable unsaturated groups can easily be introduced into the molecular chain ends.

A method may also be employed in which a (meth)acrylic polymer is obtained using a metallocene catalyst and a thiol compound having at least one reactive silicon group in the molecule as taught in Japanese Laid-Open Patent Application Publication No. 2001-040037.

The polymerizable unsaturated group of the macromonomer (b2) may have a structure represented by the following formula (7).

$$CH_2=C(R^8)-COO-Z \qquad (7)$$

In this formula, $R^8$ is hydrogen or a methyl group, and Z is the backbone chain of the macromonomer (b3).

The number-average molecular weight of the macromonomer (b2) may be 1,000 or more, 3,000 or more, or 5,000 or more. The number-average molecular weight may be 50,000 or less or 30,000 or less. If the number-average molecular weight of the macromonomer (b2) is small, this tends to lead to a failure to achieve high bonding performance, although resulting in a low viscosity of the (meth) acrylic ester polymer (B). If the number-average molecular weight of the macromonomer (b3) is excessively large, this tends to lead to an excessively high viscosity which makes handling difficult.

The macromonomer (b2) is not limited to having a particular molecular weight distribution (weight-average molecular weight (Mw)/number-average molecular weight (Mn)), but may have a narrow molecular weight distribution. The polydispersity index Mw/Mn may be less than 2.0, 1.6 or less, 1.5 or less, 1.4 or less, 1.3 or less, or 1.2 or less.

The number-average molecular weight (Mn) and weight-average molecular weight (Mw) of the macromonomer (b2) are measured by GPC (polystyrene equivalent). The details of the measurement method are described below in Examples.

The (meth)acrylic ester polymer (B) is constituted by the macromonomer (b2) and other monomers. The main chain of the (meth)acrylic ester polymer (B) will be referred to as "trunk chain", and a polymer chain derived from the macromonomer (b2) and branched from the trunk chain will be referred to as "branched chain". The monomers constituting the trunk chain and branched chain may be any of the monomers as described above, and are not limited to particular ones of the above-described monomers. In order to achieve high bonding performance, the glass transition temperature (Tg) of the branched chain may be lower than the Tg of the trunk chain.

The Tg of the trunk chain may be from −60 to 150° C., from 0 to 130° C., or from 30 to 100° C.

The Tg of the branched chain may be from −100 to 150° C., from −90 to 100° C., or from −80 to 50° C. The glass transition temperatures Tg are determined by the following Fox equation.

Fox equation: $1/(Tg(K))=\Sigma(Mi/Tgi)$

In this equation, Mi is the weight fraction of a monomer i component of the polymer and Tgi is the glass transition temperature (K) of a homopolymer of the monomer i.

The glass transition temperature of the homopolymer is determined with reference to the glass transition temperatures (Tg) indicated in POLYMER HANDBOOK—FOURTH EDITION—(J. Brandrup et al.). When the Tg is calculated by the Fox equation, the monomer having a reactive silicon group is excluded from the calculation.

The content of the macromonomer (b2) or the total content of the macromonomers (b2) may be from 1 to 50% by weight, from 5 to 40% by weight, or from 10 to 30% by weight based on the total monomers constituting the (meth) acrylic ester polymer (B).

The macromonomer (b2) may be introduced into either the molecular chain ends or side chains of the (meth)acrylic ester polymer (B). In terms of bonding performance, the macromonomer (b2) may be introduced into the side chains of the (meth)acrylic ester polymer (B). The average number of the macromonomers per molecule of the (meth)acrylic ester polymer (B) may be 0.01 or more, 0.03 or more, 0.05 or more, and may be 2.0 or less, 1.5 or less, or 1.3 or less.

(Alkyl (meth)acrylate (b3))

The alkyl group of the alkyl (meth)acrylate (b3) has 1 to 3 carbon atoms. Specific examples of the alkyl (meth) acrylate (b3) include methyl (meth)acrylate, ethyl (meth) acrylate, n-propyl (meth)acrylate, and isopropyl (meth)acrylate. One of these (meth)acrylates may be used alone, or two or more thereof may be used in combination.

In order to ensure both flexibility and high stiffness, the content of the alkyl (meth)acrylate (b3) or the total content of the alkyl (meth)acrylates (b3) may be 40% by weight or more, 45% by weight or more, 50% by weight or more, 55% by weight or more, or 60% by weight or more based on the total monomers constituting the (meth)acrylic ester polymer (B) produced by polymerization using the macromonomer (b2). In terms of retention of bonding performance, the (total) content of the alkyl (meth)acrylate(s) (b3) may be 50% by weight or more, 55% by weight or more, or 60% by weight or more based on the total monomers constituting the (meth)acrylic ester polymer (B). In order to ensure the compatibility with the polyoxyalkylene polymer (A), the (total) content of the alkyl (meth)acrylate(s) (b1) may be 70% by weight or less or 65% by weight or less.

The (meth)acrylic ester polymer (B) produced by polymerization using the macromonomer (b2) is a polymer containing constituent monomers including at least the monomer (b1) having a reactive silicon group and a polymerizable unsaturated group and the macromonomer (b2), and may contain other constituent monomers such as the alkyl (meth) acrylate (b3) having an alkyl having 1 to 3 carbon atoms and monomers other than the monomers (b1) to (b3). Examples of the monomers other than the monomers (b1) to (b3) include (meth)acrylic monomers that are not categorized as the monomers (b1) to (b3) and monomers other than (meth) acrylic monomers. Specifically, the various monomers mentioned above as examples for the macromonomer (b2) can be used.

The (meth)acrylic ester polymer (B) produced by polymerization using the macromonomer (b2) is synthesized by copolymerizing the monomer (b1) having a reactive silicon group and a polymerizable unsaturated group with the other monomer(s). Through this synthesis, the reactive silicon groups can be randomly introduced into the main chain of the polymer. To further introduce reactive silicon groups into the (meth)acrylic ester polymer (B), the methods as previously described can also be used.

The types and proportions of the monomers of the (meth) acrylic ester polymer (B) can be chosen depending on the application and purpose. In an application requiring high strength, monomers having a relatively high glass transition temperature (Tg) are preferred. The glass transition temperature may be from 0 to 200° C. or from 20 to 100° C. The Tg can be determined by the Fox equation given above.

The number-average molecular weight of the (meth) acrylic ester polymer (B) is not limited to a particular range. The number-average molecular weight, as determined by GPC analysis as a polystyrene equivalent molecular weight, may be from 500 to 50,000, from 500 to 30,000, or from 1,000 to 10,000. In particular, in order to maintain high bonding performance after moisture-heat exposure test, the number-average molecular weight of the (meth)acrylic ester polymer (B) may be 3000 or less.

Methods for blending the (meth)acrylic ester polymer (B) and the polyoxyalkylene polymer (A) are proposed, for example, in Japanese Laid-Open Patent Application Publication No. S59-122541, Japanese Laid-Open Patent Application Publication No. S63-112642, Japanese Laid-Open Patent Application Publication No. H6-172631, and Japanese Laid-Open Patent Application Publication No. H11-116763. An alternative method is to polymerize a (meth) acrylic ester monomer in the presence of a polyoxypropylene polymer having a reactive silicon group.

The weight ratio between the polyoxyalkylene polymer (A) and the (meth)acrylic ester polymer (B) (the weight ratio (A):(B)) may be from 95:5 to 50:50; that is, the proportion of the polymer (A) may be from 50 to 95% by weight. When the proportion of the polymer (A) is in this range, a cured product having flexibility and high shear bond strength can be obtained. In order to ensure both high stiffness and flexibility, the weight ratio (A):(B) may be from 80:20 to 50:50 or from 70:30 to 50:50.

<<Epoxy Resin (C)>>

Examples of the epoxy resin (C) include: epichlorohydrin-bisphenol A epoxy resins; epichlorohydrin-bisphenol F epoxy resins; flame retardant epoxy resins such as glycidyl ether of tetrabromobisphenol A; novolac epoxy resins; hydrogenated bisphenol A epoxy resins; glycidyl ether epoxy resins such as glycidyl ether of a bisphenol A propylene oxide adduct; glycidyl ether ester epoxy resins such as glycidyl ether ester of p-hydroxybenzoic acid; m-aminophenol epoxy resins; diaminodiphenylmethane epoxy resins; urethane-modified epoxy resins; alicyclic epoxy resins; N,N-diglycidylaniline; N,N-diglycidyl-o-toluidine; triglycidyl isocyanurate; polyalkylene glycol diglycidyl ether; glycidyl ethers of polyols such as glycerin; hydantoin epoxy resins; and epoxidized products of unsaturated polymers such as petroleum resins. The epoxy resin (C) is not limited to these resins, and any common epoxy resin can be used. Epoxy resins having at least two epoxy groups per molecule are preferred since such epoxy resins exhibit high reactivity during curing and since the use of such epoxy resins is likely to lead to the cured product having a three-dimensional network structure. More preferred epoxy resins include bisphenol A epoxy resins and novolac epoxy resins.

The epoxy resin (C) may be used in such an amount that the weight ratio between the total of the polyoxyalkylene polymer (A) and (meth)acrylic ester polymer (B) and the epoxy resin (C) (weight ratio [(A+B):(C)]) is from 90:10 to 50:50, namely in such an amount that the proportion of (A+B) is from 50 to 90% by weight. If the proportion of (A+B) is more than 90%, the resulting cured product has a reduced strength. If the proportion of (A+B) is less than 50%, the resulting cured product has a reduced flexibility and is excessively hard. The weight ratio may be from 80:20 to 60:40 in terms of the balance between flexibility and strength.

Young's modulus is an indicator of stiffness. The Young's modulus of the cured product obtained by curing the curable composition according to the present embodiment can be controlled as appropriate by adjusting the weight ratios among the polyoxyalkylene polymer (A), (meth)acrylic ester polymer (B), and epoxy resin (C) within the ranges as defined herein. For example, to obtain a cured product having a Young's modulus as measured at 23° C. of less than 100 MPa, it is preferable to adjust the weight ratio (A):(B) in the range of 95:5 to 60:40 and the weight ratio (A+B):(C) in the range of 90:10 to 60:40.

To obtain a cured product having a Young's modulus as measured at 23° C. of 100 MPa or more, it is preferable to adjust the weight ratio (A):(B) in the range of 80:20 to 50:50 and the weight ratio (A+B):(C) in the range of 80:20 to 50:50.

<<Epoxy Resin Curing Agent (D) Having Tertiary Amine Moiety>>

An epoxy resin curing agent having a tertiary amine moiety may be used as the epoxy resin curing agent (D) for curing the epoxy resin (C). With the use of the epoxy resin curing agent (D) having a tertiary amine moiety, a cured product having high stiffness, high strength, and high degree of elongation can be obtained. In the first aspect, the epoxy resin curing agent is a compound that is not categorized as the alicyclic structure-containing amine described later. In the second aspect, the epoxy resin curing agent is a compound that is not categorized as the amino alcohol compound described later. The tertiary amine moiety in the second aspect has no alcoholic hydroxy group, but may have a phenolic hydroxy group.

Any compound having a tertiary amine moiety can be used as the epoxy resin curing agent (D) having a tertiary amine moiety. Specific examples of the compound include, but are not limited to, N,N,N',N'-tetramethyl-1,3-diaminopropane, N,N,N',N'-tetramethyl-1,6-diaminohexane, N,N-dimethylbenzylamine, N-methyl-N-(dimethylaminopropyl) aminoethanol, 2,4,6-tris(dimethylaminomethyl)phenol, tripropylamine, DBU, DBN, and salts of these tertiary amines. Two or more epoxy resin curing agents may be used in combination, and a known epoxy resin curing agent other than the component (D) may be added.

The epoxy resin curing agent (D) having a tertiary amine moiety may be an aromatic amine and may have three or more amino groups. A specific example is 2,4,6-tris(dimethylaminomethyl)phenol.

The amount of the epoxy resin curing agent (D) used may be from 0.1 to 50 parts by weight, from 0.1 to 40 parts by weight, or from 0.5 to 30 parts by weight per 100 parts by weight of the epoxy resin (C).

<<Alicyclic Structure-Containing Amine (E1)>>

The alicyclic structure-containing amine (E1) used in the first aspect is an organic compound having an amino group and an alicyclic structure. Thanks to the inclusion of this compound, the curable composition according to the first aspect can exhibit relatively high stiffness by being subjected to a relatively short heating step.

The alicyclic structure-containing amine (E1) may be an amine having an alicyclic structure and having no aromatic or heterocyclic group. Any amine that is categorized as the above epoxy resin curing agent (D) having a tertiary amine moiety is not considered the alicyclic structure-containing amine (E1). Thus, the alicyclic structure-containing amine (E1) may be a primary or secondary amine having an alicyclic structure. The alicyclic structure-containing amine (E1) may be a compound having an amino group bonded directly to an alicyclic skeleton because such a compound is highly effective in achieving sufficient stiffness by a relatively short heating step.

The alicyclic structure of the amine (E1) is not limited to a particular type. The alicyclic structure may be saturated or unsaturated and may be monocyclic, bicyclic, or polycyclic. Specific examples of the alicyclic structure include cyclopentyl, cyclohexyl, cycloheptyl, and cyclooctyl groups.

Specific examples of the alicyclic structure-containing amine (E1) include, but are not limited to, isophorone diamine, 4,4'-diaminodicyclohexylmethane, 4,4'-methylenebis(2-methylcyclohexanamine), cyclohexylamine, dicyclohexylamine, 1,3-bis(aminomethyl)cyclohexane, norbornene diamine, 1,2-diaminocyclohexane, and Ancamine 2167 and 2264 (manufactured by Evonik Industries). Modified products of these amines may be used. Specific examples include: Ancamine 1618, Ancamine 2074, Ancamine 2596, Ancamine 2199, Sunmide IM-544, Sunmide 1-544, Ancamine 2075, Ancamine 2280, Ancamine 1934, and Ancamine 2228 manufactured by Evonik Industries; Daitocurar F-5194 and Daitocurar B-1616 manufactured by Daito Sangyo Co., Ltd.; Laromin C-260 manufactured by BASF; and Fujicure FXD-821 and Fujicure 4233 manufactured by T&K TOKA Co., Ltd. One of these may be used alone, or a mixture of two or more thereof may be used.

The amount of the alicyclic structure-containing amine (E1) used may be from 1 to 40 parts by weight, from 3 to 35 parts by weight, or from 5 to 25 parts by weight per 100 parts by weight of the epoxy resin (C).

<<Amino Alcohol Compound (E2)>>

The amino alcohol compound (E2) used in the second aspect is an organic compound having an amino group and an alcoholic hydroxy group. Thanks to the inclusion of this compound, the curable composition according to the second aspect can exhibit relatively high stiffness by being subjected to a relatively short heating step. Any hydroxy group bonded to an aromatic ring is referred to as a "phenolic hydroxy group" and is not considered the alcoholic hydroxy group as defined herein.

The amino alcohol compound (E2) may be an amino alcohol compound having no aromatic ring. To be specific, the amino alcohol compound (E2) may be an aliphatic compound having an amino group and an alcoholic hydroxy group or an alicyclic compound having an amino group and an alcoholic hydroxy group. Aliphatic compounds having an amino group and an alcoholic hydroxy group are more preferred, and alkane compounds having an amino group and an alcoholic hydroxy group are even more preferred. Specific examples include: monoalcoholamines such as methanolamine, ethanolamine, propanolamine, dimethylaminoethanol, and N-methylethanolamine; dialcoholamines such as diethanolamine and dipropanolamine; and trialcoholamines such as triethanolamine and tripropanolamine. Trialcoholamines are preferred, and triethanolamine is particularly preferred.

The amount of the amino alcohol compound (E2) used may be from 1 to 40 parts by weight, from 3 to 35 parts by weight, or from 5 to 25 parts by weight per 100 parts by weight of the epoxy resin (C).

The alicyclic structure-containing amine (E1) and the amino alcohol compound (E2) may be used in combination.

<<Silanol Condensation Catalyst (F)>>

A silanol condensation catalyst (F) may be used to accelerate a condensation reaction of the reactive silicon groups of the polyoxyalkylene polymer (A) and (meth)acrylic ester polymer (B) and increase the polymer chain length or induce polymer crosslinking.

Examples of the silanol condensation catalyst (F) include an organotin compound, a metal carboxylate, an amine compound, a carboxylic acid, and an alkoxy metal.

Specific examples of the organotin compound include dibutyltin dilaurate, dibutyltin dioctanoate, dibutyltin bis (butyl maleate), dibutyltin diacetate, dibutyltin oxide, dibutyltin bis(acetylacetonate), dioctyltin bis(acetylacetonate), dioctyltin dilaurate, dioctyltin distearate, dioctyltin diacetate, dioctyltin oxide, a reaction product of dibutyltin oxide and a silicate compound, a reaction product of dioctyltin oxide and a silicate compound, and a reaction product of dibutyltin oxide and a phthalic ester.

Specific examples of the metal carboxylate include tin carboxylate, bismuth carboxylate, titanium carboxylate, zirconium carboxylate, and iron carboxylate. The metal carboxylate may be a combination of any of carboxylic acids mentioned below and any of various metals.

Specific examples of the amine compound include: amines such as octylamine, 2-ethylhexylamine, laurylamine, and stearylamine; nitrogen-containing heterocyclic compounds such as pyridine, 1,8-diazabicyclo[5,4,0]undec-7-ene (DB U), and 1,5-diazabicyclo[4,3,0]non-5-ene (DBN); guanidines such as guanidine, phenylguanidine, and diphenylguanidine; biguanides such as butylbiguanide, 1-(o-tolyl) biguanide, and 1-phenylbiguanide; amino group-containing silane coupling agents; and ketimine compounds.

Specific examples of the carboxylic acid include acetic acid, propionic acid, butyric acid, 2-ethylhexanoic acid, lauric acid, stearic acid, oleic acid, linoleic acid, neodecanoic acid, and versatic acid.

Specific examples of the alkoxy metal include: titanium compounds such as tetrabutyl titanate, titanium tetrakis (acetylacetonate), and diisopropoxytitanium bis(ethyl acetoacetate); aluminum compounds such as aluminum tris (acetylacetonate) and diisopropoxyaluminum ethyl acetoacetate); and zirconium compounds such as zirconium tetrakis (acetylacetonate).

The amount of the silanol condensation catalyst (F) used may be from 0.001 to 20 parts by weight, from 0.01 to 15 parts by weight, or from 0.01 to 10 parts by weight per 100 parts by weight of the total of the polyoxyalkylene polymer (A) and (meth)acrylic ester polymer (B).

<<Water (G)>>

Water (G) may be added to the B part of the curable composition. The addition of water accelerates curing of the polyoxyalkylene polymer (A) and (meth)acrylic ester polymer (B) when the A and B parts are mixed.

The amount of the water (G) added may be from 0.1 to 10 parts by weight, from 0.1 to 5 parts by weight, or from 0.1 to 2 parts by weight per 100 parts by weight of the total of the polyoxyalkylene polymer (A) and (meth)acrylic ester polymer (B). The curable composition may include a C part containing the water (G) in addition to the A and B parts. In this case, the curable composition is a three-part composition.

<<Additional Components>>

Additional components may be contained in the curable composition in addition to the polyoxyalkylene polymer (A), (meth)acrylic ester polymer (B), epoxy resin (C), epoxy resin curing agent (D), alicyclic structure-containing amine (E1), amino alcohol compound (E2), silanol condensation catalyst (F), and water (G). Examples of the additional components include a filler, an adhesion promoter, an anti-sagging agent, an antioxidant, a light stabilizer, an ultraviolet absorber, a tackifying resin, and another resin. Further, various additives may be added, if desired, to the curable composition in order to adjust the physical properties of the curable composition or a cured product of the composition. Examples of the additives include a plasticizer, a solvent, a diluent, a photocurable material, an oxygen-curable material, a surface modifier, a silicate, a curability modifier, a radical inhibitor, a metal deactivator, an antiozonant, a phosphorus-based peroxide decomposer, a lubricant, a pigment, a fungicide, a flame retardant, and a foaming agent.
<Filler>

Various fillers can be added to the curable composition. Examples of the fillers include heavy calcium carbonate, colloidal calcium carbonate, magnesium carbonate, diatomite, clay, talc, titanium oxide, fumed silica, precipitated silica, crystalline silica, molten silica, silicic anhydride, hydrated silicic acid, alumina, carbon black, ferric oxide, aluminum fines, zinc oxide, activated zinc oxide, PVC powder, PMMA powder, and glass fibers or filaments. To efficiently provide thixotropy to the composition, the use of fumed silica is more preferred.

The amount of the filler used may be from 1 to 300 parts by weight or from 10 to 250 parts by weight per 100 parts by weight of the total of the polyoxyalkylene polymer (A) and (meth)acrylic ester polymer (B).

An organic or inorganic balloon may be added to reduce the weight (or reduce the specific gravity) of the composition.
<Adhesion Promoter>

An adhesion promoter can be added to the curable composition.

A silane coupling agent or a reaction product of a silane coupling agent can be added as the adhesion promoter.

Specific examples of the silane coupling agent include: amino group-containing silanes such as γ-aminopropyltrimethoxysilane, γ-aminopropylmethyldimethoxysilane, N-β-aminoethyl-γ-aminopropyltrimethoxysilane, N-β-aminoethyl-γ-aminopropylmethyldimethoxysilane, N-phenyl-γ-aminopropyltrimethoxysilane, and (2-aminoethyl)aminomethyltrimethoxysilane; isocyanate group-containing silanes such as γ-isocyanatopropyltrimethoxysilane, γ-isocyanatopropyltriethoxysilane, γ-isocyanatopropylmethyldimethoxysilane, α-isocyanatomethyltrimethoxysilane, and α-isocyanatomethyldimethoxymethylsilane; mercapto group-containing silanes such as γ-mercaptopropyltrimethoxysilane, γ-mercaptopropyltriethoxysilane, and γ-mercaptopropylmethyldimethoxysilane; and epoxy group-containing silanes such as γ-glycidoxypropyltrimethoxysilane and β-(3,4-epoxycyclohexyl)ethyltrimethoxysilane.

One of the above adhesion promoters may be used alone, or a mixture of two or more thereof may be used. Reaction products of various silane coupling agents can also be used.

The amount of the adhesion promoter used may be from 0.1 to 20 parts by weight and or from 0.5 to 10 parts by weight per 100 parts by weight of the total of the polyoxyalkylene polymer (A) and (meth)acrylic ester polymer (B).
<Anti-Sagging Agent>

An anti-sagging agent may be added, if desired, to the curable composition to prevent sagging and improve workability. Examples of the anti-sagging agent include, but are not limited to, polyamide waxes, hydrogenated castor oil derivatives, and metallic soaps such as calcium stearate, aluminum stearate, and barium stearate. One of these anti-sagging agents may be used alone, or two or more thereof may be used in combination.

The amount of the anti-sagging agent used may be from 0.1 to 20 parts by weight per 100 parts by weight of the total of the polyoxyalkylene polymer (A) and (meth)acrylic ester polymer (B).
<Antioxidant>

An antioxidant (anti-aging agent) can be used in the curable composition. The use of an antioxidant can increase the weathering resistance of the cured product. Examples of the antioxidant include hindered phenol antioxidants, monophenol antioxidants, bisphenol antioxidants, and polyphenol antioxidants. Specific examples of the antioxidant are described in Japanese Laid-Open Patent Application Publication No. H4-283259 and Japanese Laid-Open Patent Application Publication No. H9-194731.

The amount of the antioxidant used may be from 0.1 to 10 parts by weight or from 0.2 to 5 parts by weight per 100 parts by weight of the total of the polyoxyalkylene polymer (A) and (meth)acrylic ester polymer (B).
<Light Stabilizer>

A light stabilizer can be used in the curable composition. The use of a light stabilizer can prevent photooxidative degradation of the cured product. Examples of the light stabilizer include benzotriazole, hindered amine, and benzoate compounds. Particularly preferred are hindered amine compounds.

The amount of the light stabilizer used may be from 0.1 to 10 parts by weight or from 0.2 to 5 parts by weight per 100 parts by weight of the total of the polyoxyalkylene polymer (A) and (meth)acrylic ester polymer (B).
<Ultraviolet Absorber>

An ultraviolet absorber can be used in the curable composition. The use of an ultraviolet absorber can increase the surface weathering resistance of the cured product. Examples of the ultraviolet absorber include benzophenone, benzotriazole, salicylate, substituted tolyl, and metal chelate compounds. Particularly preferred are benzotriazole compounds, examples of which include those sold under the names Tinuvin P, Tinuvin 213, Tinuvin 234, Tinuvin 326, Tinuvin 327, Tinuvin 328, Tinuvin 329, and Tinuvin 571 (all of these are manufactured by BASF).

The amount of the ultraviolet absorber used may be from 0.1 to 10 parts by weight or from 0.2 to 5 parts by weight per 100 parts by weight of the polyoxyalkylene polymer (A) and (meth)acrylic ester polymer (B).
<Tackifying Resin>

A tackifying resin can be added, if desired, to the curable composition for the purpose of increasing the bond strength or adhesion to a substrate or any other purpose. The tackifying resin used is not limited to a particular type, and may be a commonly used tackifying resin.

Specific examples of the tackifying resin include terpene resins, aromatic modified terpene resins, hydrogenated terpene resins, terpene-phenol resins, phenol resins, modified phenol resins, xylene-phenol resins, cyclopentadiene-phenol resins, coumarone-indene resins, rosin resins, rosin ester resins, hydrogenated rosin ester resins, xylene resins, low-molecular-weight polystyrene resins, styrene copolymer resins, styrene block copolymers, hydrogenated styrene block copolymers, petroleum resins (such as C5 hydrocarbon resins, C9 hydrocarbon resins, and C5-C9 hydrocarbon copolymer resins), hydrogenated petroleum resins, and DCPD resins. One of these resins may be used alone, or two or more thereof may be used in combination.

The amount of the tackifying resin used may be from 2 to 100 parts by weight, from 5 to 50 parts by weight, or from 5 to 30 parts by weight per 100 parts by weight of the total of the polyoxyalkylene polymer (A) and (meth)acrylic ester polymer (B).

<<Preparation of Curable Composition>>

The curable composition according to the first aspect may be prepared as a two-part composition consisting of: the A part including the polyoxyalkylene polymer (A), acrylic ester polymer (B), epoxy resin curing agent (D), alicyclic structure-containing amine (E1), and additional components; and the B part including the epoxy resin (C) and additional components. In this case, the A and B parts are mixed before use. The silanol condensation catalyst (F) and/or water (G) may be added to the B part to accelerate the curing reaction of the polyoxyalkylene polymer (A) and acrylic ester polymer (B).

The curable composition according to the second aspect may be prepared as a two-part composition consisting of: the A part including the polyoxyalkylene polymer (A), acrylic ester polymer (B), epoxy resin curing agent (D), and additional components; and the B part including the epoxy resin (C) and additional components. In this case, the A and B parts are mixed before use. The amino alcohol compound (E2) is included in either or both of the A and B parts. The silanol condensation catalyst (F) and/or water (G) may be added to the B part to accelerate the curing reaction of the polyoxyalkylene polymer (A) and acrylic ester polymer (B).

The curable composition according to the present embodiment may be cured at room temperature or by heating. In the case where different kinds of materials are joined with an adhesive, in particular when the adhesive is cured by heating, the problem of thermal distortion could arise because of the difference in linear expansion coefficient between the different kinds of materials. In general, when a reaction-curable adhesive such as an epoxy composition or a urethane composition having high stiffness is cured by heating, the cured adhesive, although having a high bond strength, has a significantly reduced flexibility, due to which the adhesive could be thermally distorted during cooling. In contrast, when the curable composition according to the present embodiment is cured by heating so as to give a cured product having a high bond strength, the cured product is a rubbery product having a Young's modulus of several to several tens of MPa and can avoid being thermally distorted. Further, the subsequent aging at room temperature gives rise to high stiffness. Thus, a high-stiffness adhesive free from thermal distortion can be produced.

In order to ensure both high stiffness and flexibility, the cured product obtained by curing the curable composition according to the present embodiment may have a Young's modulus of 90 MPa or more at 23° C. or may have a Young's modulus of 200 MPa or more at 23° C. The elongation at break of the cured product may be 70% or more or 80% or more at 23° C. The methods of measuring the Young's modulus and elongation at break are as described below in Examples.

<<Surface Treatment of Adherends>>

The curable composition according to the present embodiment can exhibit high bonding performance to various adherends such as plastics, metals, and composites. When the curable composition is used as an adhesive for a non-polar material such as polypropylene or for an engineering plastic having a rigid molecular chain such as polyphenylene sulfide, the adherends may be surface-treated beforehand by a known technique in order to enhance the bonding performance to the adherends and achieve a stable bond strength. Examples of the surface treatment technique that can be used include sanding treatment, flame treatment, corona discharge, arc discharge, and plasma treatment. The plasma treatment is preferred since this technique causes little damage to the adherends and results in stable bonding performance. The surface treatments are also effective to remove a mold release used in molding and remaining on the surfaces of the adherends.

The curable composition according to the present embodiment exhibits intended physical properties by being subjected to a long curing (aging) step after joining of adherends and at the same time is characterized by quick increase in stiffness. Specifically, when the curable composition that has yet to cure is subjected to a relatively short heating step after joining of adherends, the resulting semi-cured product can exhibit a certain level of stiffness although this stiffness is below the intended final stiffness. As such, the curable composition according to the present embodiment can be suitably used as a structural adhesive for joining adherends in a line production system where a series of production steps are carried out continuously.

The short heating step mentioned above is not limited to particular conditions. For example, the heating temperature is from 50 to 200° C., and the heating time is from 1 minute to 1 hour.

The final curing (aging) step performed after the short heating step to allow the curable composition to exhibit the intended final physical properties is not limited to particular conditions. For example, the curing (aging) temperature is from 5 to 50° C., and the curing (aging) time is from 24 hours to 1 week.

<<Applications>>

The curable composition is suitable for use as an adhesive composition and can be used, for example, as a sealing material, an adhesive, a pressure-sensitive adhesive, and a waterproofing material for buildings, ships, automobiles, and roads. The cured product obtained by curing the curable composition is flexible in spite of having high stiffness; thus, it is more preferable to use the curable composition as an adhesive, in particular a structural adhesive. In the case where different kinds of materials are joined, such as when aluminum and steel or aluminum and a composite are joined, a temperature change causes thermal distortion due to the difference in linear expansion coefficient between the two materials. In such a case, an adhesive having a high degree of elongation is preferred to accommodate the thermal distortion. Hence, the curable composition can be suitably used for joining of different kinds of materials. When different kinds of materials are joined, the joint may be covered by a sealer to prevent corrosion. The reactive silicon group-containing polymers as described herein can be used as the sealer. The curable composition may be used as an adhesive for automobile components such as automobile panels, components of large vehicles such as trucks and buses, components of railcars, components of aircrafts, components of ships, components of electric machines, or various mechanical components.

EXAMPLES

Hereinafter, one or more embodiments of the present invention will be specifically described using examples. The examples are not intended to limit one or more embodiments of the present invention.

In the examples, the number-average molecular weights are GPC molecular weights measured under the following conditions.

Delivery system: HLC-8120 GPC manufactured by Tosoh Corporation
Column: TSK-GEL H Type manufactured by Tosoh Corporation
Solvent: THF
Molecular weight: Polystyrene equivalent
Measurement temperature: 40° C.

In the examples, the terminal group equivalent molecular weights are molecular weights each of which was determined as follows: hydroxy and iodine values were measured, respectively, by the measurement method as specified in JIS K 1557 and the measurement method as specified in JIS K 0070, and the molecular weight was calculated based on the hydroxy and iodine values taking into account the architecture of the organic polymer (in particular, the degree of branching which depends on the polymerization initiator used).

For the polymers (Q) in the examples, the average number of unsaturated carbon-carbon bonds introduced per polymer end was calculated by the following equation.

Average number of introduced unsaturated carbon-carbon bonds=[Unsaturated group concentration (mol/g) of polymer (Q) as determined from iodine value−unsaturated group concentration (mol/g) of precursor polymer (P) as determined from iodine value]/[hydroxy group concentration (mol/g) of precursor polymer (P) as determined from hydroxy value]

For the polymers (A) in the examples, the average number of silyl groups introduced per polymer end was calculated by NMR analysis.

Synthesis Example 1

Propylene oxide was polymerized using polyoxypropylene glycol having a number-average molecular weight of about 2,000 as an initiator in the presence of a zinc hexacyanocobaltate-glyme complex catalyst. This polymerization yielded polyoxypropylene (P-1) terminated at both ends by hydroxy groups and having a number-average molecular weight of 28,500 (terminal group equivalent molecular weight of 17,700) and a polydispersity index Mw/Mn of 1.21. Sodium methoxide dissolved in methanol at a concentration of 28% was added in an amount of 1.0 molar equivalents per molar equivalent of the hydroxy groups of the hydroxy-terminated polyoxypropylene (P-1). After methanol was distilled off under vacuum, 1.0 molar equivalents of allyl glycidyl ether was added per molar equivalent of the hydroxy groups of the hydroxy-terminated polyoxypropylene, and the reaction was allowed to proceed at 130° C. for 2 hours. Subsequently, 0.28 molar equivalents of sodium methoxide dissolved in methanol was added, then methanol was removed, and 1.79 molar equivalents of allyl chloride was further added to convert the terminal hydroxy groups to allyl groups. To 100 parts by weight of the unpurified, ally-terminated polyoxypropylene were added 300 parts by weight of n-hexane and 300 parts by weight of water, and the mixture was stirred and then centrifuged to remove water. To the resulting hexane solution was then added 300 parts by weight of water, and the mixture was stirred and then centrifuged to remove water. This was followed by devolatilization under reduced pressure to remove hexane. Through the above procedures, polyoxypropylene (Q-1) having a terminal structure having two or more unsaturated carbon-carbon bonds was obtained. For the polymer (Q-1), it was found that 2.0 unsaturated carbon-carbon bonds were introduced on average per terminal moiety.

To 100 parts by weight of the polyoxypropylene (Q-1) having 2.0 unsaturated carbon-carbon bonds on average per terminal moiety was added 36 ppm of a platinum-divinyldisiloxane complex (isopropanol solution with a concentration of 3% by weight calculated as the platinum content), and then 2.2 parts by weight of trimethoxysilane was slowly added dropwise under stirring. The liquid mixture was left to allow the reaction to proceed at 90° C. for 2 hours, after which trimethoxysilane remaining unreacted was distilled off under reduced pressure to give a reactive silicon group-containing linear polyoxypropylene polymer (A-1) having 1.6 trimethoxysilyl groups on average per terminal moiety, 3.2 silicon groups on average per molecule, and a number-average molecular weight of 28,500.

Synthesis Example 2

A four-necked flask equipped with a stirrer was charged with 48.6 parts by weight of isobutanol, which was heated to 105° C. under nitrogen atmosphere. To the heated isobutanol was added dropwise over 5 hours a liquid mixture prepared by dissolving 65.0 parts by weight of methyl methacrylate, 25.0 parts by weight of 2-ethylhexyl acrylate, 10.0 parts by weight of 3-methacryloxypropyltrimethoxysilane, 7.2 parts by weight of 3-mercaptopropyltrimethoxysilane, and 2.5 parts by weight of 2,2'-azobis(2-methylbutyronitrile) in 22.7 parts by weight of isobutanol. Polymerization was allowed to proceed at 105° C. for 2 hours to give an isobutanol solution (solid content=60%) of a reactive silicon group-containing (meth)acrylic ester polymer (B-1) having 1.6 silicon groups on average per molecule and having a number-average molecular weight of 2,300. The reactive silicon group content in the solids was 0.72 mmol/g.

Synthesis Example 3

A reactor from which oxygen was removed was charged with 0.42 parts by weight of cuprous bromide and 20.0 parts by weight of butyl acrylate, and they were stirred under heating. To the mixture were added 8.8 parts by weight of acetonitrile serving as a polymerization solvent and 1.90 parts by weight of ethyl 2-bromoadipate serving as an initiator. The temperature of the liquid mixture was adjusted to about 80° C., and at this moment pentamethyldiethylenetriamine (hereinafter abbreviated as "triamine") was added to initiate a polymerization reaction. Subsequently, 80.0 parts by weight of butyl acrylate was added in batches to allow the polymerization reaction to proceed. During the polymerization, triamine was added at appropriate times to adjust the polymerization rate. The total amount of triamine used for the polymerization was 0.15 parts by weight. After the monomer conversion percentage (polymerization reaction percentage) exceeded about 95%, volatile matter was removed by devolatilization under reduced pressure to give a polymer concentrate.

The concentrate was diluted with toluene. To the dilution were added a filtration aid, an adsorbent (KYOWAAD 700SEN, manufactured by Kyowa Chemical Industry Co., Ltd.), and hydrotalcite (KYOWAAD 500SH, manufactured by Kyowa Chemical Industry Co., Ltd.). The mixture was stirred under heating to about 80 to 100° C. and then filtered to remove solids. The filtrate was concentrated under reduced pressure to give a roughly purified polymer.

To the roughly purified polymer were added 1.98 parts by weight of potassium acrylate, 100 ppm of 4-hydroxy-TEMPO, and 100 parts by weight of dimethylacetamide serving as a solvent, and the reaction was allowed to proceed at 70° C. for 3 hours. After that, the solvent was distilled off under reduced pressure to give a polymer concentrate. The concentrate was diluted with toluene, and the dilution was filtered to remove solids. The filtrate was concentrated under reduced pressure to give a macromonomer (b2-1) terminated at one end by an acryloyl group and having a number-average molecular weight of 10,500 (GPC molecular weight) and a polydispersity index (Mw/Mn) of 1.18.

Synthesis Example 4

A four-necked flask equipped with a stirrer was charged with 48.0 parts by weight of isobutanol, which was heated to 105° C. under nitrogen atmosphere. To the heated isobutanol was added dropwise over 5 hours a liquid mixture prepared by dissolving 60.0 parts by weight of methyl methacrylate, 10.0 parts by weight of stearyl methacrylate, 20 parts by weight of the macromonomer (b2-1) prepared in Synthesis Example 2, 10.0 parts by weight of 3-methacryloxypropyltrimethoxysilane, 7.2 parts by weight of 3-mercaptopropyltrimethoxysilane, and 2.5 parts by weight of 2,2'-azobis(2-methylbutyronitrile) in 22.7 parts by weight of isobutanol. Polymerization was allowed to proceed at 105° C. for 2 hours to give an isobutanol solution (solid content=60%) of a reactive silicon group-containing (meth)acrylic ester polymer (B-2) having a number-average molecular weight of 2,120 (GPC molecular weight). In the solids contained in the solution, the macromonomer content was 0.018 mmol/g, and the reactive silicon group content was 0.72 mmol/g.

Example 1

The reactive silicon group-containing polyoxypropylene polymer (A-1) obtained in Synthesis Example 1 and the (meth)acrylic ester polymer (B-1) obtained in Synthesis Example 2 were mixed in such proportions that the amount of the polymer (A-1) was 42 parts by weight and the amount of solids of the polymer (B-1) was 28 parts by weight. After the mixing, isobutanol was removed by heating. The mixture thus obtained was mixed with 4 parts by weight of Ancamine K54 (2,4,6-tris(dimethylaminomethyl)phenol, manufactured by Evonik Industries) serving as the epoxy resin curing agent (D), 3 parts by weight of isophorone diamine (also known as 3-(aminomethyl)-3,5,5-trimethylcyclohexanamine) serving as the alicyclic structure-containing amine (E1), and 2 parts by weight of KBM-603 (N-(2-aminoethyl)-3-aminopropyltrimethoxysilane, manufactured by Shin-Etsu Chemical Co., Ltd.) serving as a silane coupling agent. The resulting mixture was used as the A part. Further, 30 parts by weight of jER 828 (bisphenol A epoxy resin, manufactured by Mitsubishi Chemical Corporation) serving as the epoxy resin (C), 0.3 parts by weight of NEOSTANN U-810 (dioctyltin dilaurate, manufactured by Nitto Kasei Co., Ltd.) serving as the silanol condensation catalyst (F), and 0.5 parts by weight of water were mixed, and the resulting mixture was used as the B part.

(Dumbbell Tensile Properties)

The A and B parts were mixed, and the mixture was formed into an about 2-mm-thick sheet, which was heated at 80° C. for 30 minutes. A No. 3 dumbbell specimen was punched out of the sheet and subjected to a tensile strength test at 23° C. and 50% RH to measure the stress at 30% elongation (M30), strength at break (TB), elongation at break (EB), and Young's modulus. The tensile properties other than the Young's modulus were measured using Autograph (AGS-J) of Shimadzu Corporation at a tensile speed of 200 mm/min. The Young's modulus was measured at a tensile speed of 10 mm/min with the displacement in the range of 0.05 to 0.3%. The results are listed in Table 1.

Examples 2 and 3 and Comparative Examples 1 to 4

Compositions were prepared and evaluated for the dumbbell tensile properties in the same manner as in Example 1, except that the component proportions were changed as shown in Table 1. The results are shown in Table 1.

The superscripts used in Table 1 denote the following compounds.
(1): 2,4,6-Tris(dimethylaminomethyl)phenol (Evonik Industries)
(2): 4,4'-Diaminodicyclohexylmethane
(3): N-(2-Aminoethyl)-3-aminopropyltrimethoxysilane (Shin-Etsu Chemical Co., Ltd.)
(4): Bisphenol A epoxy resin (Mitsubishi Chemical Corporation)
(5): Dioctyltin dilaurate (Nitto Kasei Co., Ltd.)

TABLE 1

| | Component proportions (parts by weight) | | Example 1 | Example 2 | Example 3 | Comp. Example 1 | Comp. Example 2 | Comp. Example 3 | Comp. Example 4 |
|---|---|---|---|---|---|---|---|---|---|
| A part | Polyoxyalkylene polymer (A) | A-1 | 42 | 42 | 42 | 42 | 42 | 42 | 42 |
| | (Meth)acrylic ester polymer (B) | B-1 | 28 | 28 | 28 | 28 | 28 | 28 | 28 |
| | Epoxy resin curing agent (D) | Ancamine K54[1] | 4 | 4 | 4 | 4 | 4 | 4 | 4 |
| | Alicyclic structure-containing amine (E1) | Isophorone diamine | 3 | | | | | | |
| | | Amicure PACM[2] | | 3 | | | | | |
| | | 1,3-Bis(aminomethyl)cyclohexane | | | 3 | | | | |
| | Amine other than component (E) | m-Xylylenediamine | | | | | 3 | | |
| | | N-(2-Aminoethyl)piperazine | | | | | | 3 | |
| | | Triethylenetetramine | | | | | | | 3 |
| | Silane coupling agent | KBM-603[3] | 2 | 2 | 2 | 2 | 2 | 2 | 2 |
| | (A):(B) | | 60:40 | 60:40 | 60:40 | 60:40 | 60:40 | 60:40 | 60:40 |
| | Total parts by weight of A part | | 79 | 79 | 79 | 76 | 79 | 79 | 79 |

TABLE 1-continued

| Component proportions (parts by weight) | | Example 1 | Example 2 | Example 3 | Comp. Example 1 | Comp. Example 2 | Comp. Example 3 | Comp. Example 4 |
|---|---|---|---|---|---|---|---|---|
| B part | Epoxy resin (C) jER 828[4] | 30 | 30 | 30 | 30 | 30 | 30 | 30 |
| | Silanol condensation catalyst (F) NEOSTANN U-810[5] | 0.3 | 0.3 | 0.3 | 0.3 | 0.3 | 0.3 | 0.3 |
| | Water | 0.5 | 0.5 | 0.5 | 0.5 | 0.5 | 0.5 | 0.5 |
| | (A) + (B):(C) | 70:30 | 70:30 | 70:30 | 70:30 | 70:30 | 70:30 | 70:30 |
| | Total parts by weight of B part | 30.8 | 30.8 | 30.8 | 30.8 | 30.8 | 30.8 | 30.8 |
| Dumbbell tensile properties (At 80° C. for 30 min) | M30 (MPa) | 3.0 | 3.2 | 1.7 | 1.5 | 1.8 | 0.5 | 1.0 |
| | TB (MPa) | 5.5 | 6.3 | 5.0 | 5.3 | 3.8 | 2.5 | 4.5 |
| | Young's modulus (MPa) | 15 | 28 | 13 | 5 | 6 | 2 | 3 |
| | EB (%) | 90 | 147 | 190 | 200 | 130 | 130 | 140 |

As seen from Table 1, in Examples 1 to 3 where the alicyclic structure-containing amine (E1) was added, the stiffness (Young's modulus) exhibited as a result of the short heating step performed at 80° C. for 30 minutes was higher than in Comparative Example 1 where any alicyclic structure-containing amine (E1) was not added. This leads to the conclusion that the addition of the alicyclic structure-containing amine (E1) improved the stiffness exhibited as a result of the heating step.

It is also seen that in Examples 1 and 2 where an amine compound having an amino group bonded directly to an alicyclic skeleton was used, the stiffness exhibited as a result of the heating step was higher than in Example 3 where an amine compound having no amino group bonded directly to an alicyclic skeleton was used.

The stiffness exhibited in Comparative Examples 2 to 4, where an amine compound having no alicyclic structure was added, was similar to that exhibited in Comparative Example 1. This leads to the conclusion that the improving effect on the stiffness is characteristic of the alicyclic structure-containing amine (E1).

In Example 1, after the about 2-mm-thick sheet formed from the mixture of the A and B parts was heated at 80° C. for 30 minutes as described above, the sheet was aged at 23° C. for 7 days, following which a No. 3 dumbbell specimen was punched out of the aged sheet and subjected to a tensile strength test as described above. The M30 was measured to be 10.5 MPa, the TB was measured to be 14.0 MPa, the Young's modulus was measured to be 270 MPa, and the EB was measured to be 230%. This leads to the conclusion that after being subjected to an adequate time of aging, the curable composition of Example 1 exhibits good cured product properties suitable for use as a structural adhesive.

Example 4

The reactive silicon group-containing polyoxypropylene polymer (A-1) obtained in Synthesis Example 1 and the (meth)acrylic ester polymer (B-2) obtained in Synthesis Example 4 were mixed in such proportions that the amount of the polymer (A-1) was 42 parts by weight and the amount of solids of the polymer (B-2) was 28 parts by weight. After the mixing, isobutanol was removed by heating. The mixture thus obtained was mixed with 7 parts by weight of Ancamine K54 (2,4,6-tris(dimethylaminomethyl)phenol, manufactured by Evonik industries) serving as the epoxy resin curing agent (D), 4 parts by weight of Amicure PACM (4,4'-diaminodicyclohexylmethane, manufactured by Evonik Industries) serving as the alicyclic structure-containing amine (E1), 7 parts by weight of p-dodecylphenol serving as a phenolic compound, 2 parts by weight of KBM-603 (N-(2-aminoethyl)-3-aminopropyltrimethoxysilane, manufactured by Shin-Etsu Chemical Co., Ltd.) serving as a silane coupling agent, 2 parts by weight of AEROSIL R-202 (hydrophobic fumed silica, manufactured by Nippon Aerosil Co., Ltd.) serving as a filler, and 4.5 parts by weight of AEROSIL 300 (hydrophilic fumed silica, manufactured by Nippon Aerosil Co., Ltd.) serving as a filler. The resulting mixture was used as the A part.

Further, 31.7 parts by weight of jER 828 (bisphenol A epoxy resin, manufactured by Mitsubishi Chemical Corporation) serving as the epoxy resin (C), 4 parts by weight of Sylophobic 200 (hydrophobic colloidal silica, manufactured by Fuji Silysia Chemical Ltd.) serving as a filler, 1.5 parts by weight of AEROSIL R-202 (hydrophobic fumed silica, manufactured by Nippon Aerosil Co., Ltd.) serving as a filler, 0.3 parts by weight of NEOSTANN U-810 (dioctyltin dilaurate, manufactured by Nitto Kasei Co., Ltd.) serving as the silanol condensation catalyst (F), and 0.5 parts by weight of water were mixed. The resulting mixture was used as the B part.

The dumbbell tensile properties were evaluated in the same manner as in Example 1. It should be noted that the curing conditions were varied from those in Example 1. Specifically, the curing was performed by heating at 80° C. for 15 minutes and subsequent aging at 23° C. and 50% RH for 7 days. The results are shown in Table 2.

Example 5

Compositions were prepared and evaluated for the dumbbell tensile properties in the same manner as in Example 4, except that the component proportions were changed as shown in Table 2. The results are shown in Table 2.

The superscripts used in Table 2 denote the following compounds.

(1): 2,4,6-Tris(dimethylaminomethyl)phenol (Evonik Industries)

(2): 4,4'-Diaminodicyclohexylmethane (3): 3,3'-Dimethyl-4,4'-diaminodicyclohexylmethane (4): N-(2-Aminoethyl)-3-aminopropyltrimethoxysilane (Shin-Etsu Chemical Co., Ltd.)

(5): Hydrophobic fumed silica (Nippon Aerosil Co., Ltd.)

(6): Hydrophilic fumed silica (Nippon Aerosil Co., Ltd.)

(7): Bisphenol A epoxy resin (Mitsubishi Chemical Corporation)

(8): Hydrophobic colloidal silica (Fuji Silysia Chemical Ltd.)

(9): Dioctyltin dilaurate (Nitto Kasei Co., Ltd.)

TABLE 2

| Component proportions (parts by weight) | | | Example 4 | Example 5 |
|---|---|---|---|---|
| A part | Polyoxyalkylene polymer (A) | A-1 | 42 | 42 |
| | (Meth)acrylic ester polymer (B) | B-2 | 28 | 28 |
| | Epoxy resin curing agent (D) | Ancamine K54[1] | 7 | 7 |
| | Alicyclic structure-containing amine (E1) | Amicure PACM[2] | 4 | |
| | | Laromin C260[3] | | 4 |
| | Phenolic compound | p-Dodecylphenol | 7 | 7 |
| | Silane coupling agent | KBM-603[4] | 2 | 2 |
| | Filler | AEROSIL R-202[5] | 2 | 2 |
| | | AEROSIL 300[6] | 4.5 | 4.5 |
| | (A):(B) | | 60:40 | 60:40 |
| | Total parts by weight of A part | | 96.5 | 96.5 |
| B part | Epoxy resin (C) | jER828[7] | 31.7 | 31.7 |
| | Filler | Sylophobic 200[8] | 4 | 4 |
| | | AEROSIL R-202[5] | 1.5 | 1.5 |
| | Silanol condensation catalyst (F) | NEOSTANN U-810[9] | 0.3 | 0.3 |
| | Water | | 0.5 | 0.5 |
| | Total parts by weight of B part | | 38.0 | 38.0 |
| | (A) + (B):(C) | | 70:31.7 | 70:31.7 |
| Dumbbell tensile properties (At 80° C. for 15 min + At 23° C. for 7 days) | | M30 (MPa) | 8.2 | 9.0 |
| | | TB (MPa) | 9.8 | 10.1 |
| | | Young's modulus (MPa) | 220 | 290 |
| | | EB (%) | 80 | 90 |

Table 2 reveals that in Examples 4 and 5, a cured product having high stiffness (Young's modulus) was obtained as a result of the fact that a compound having an amino group bonded directly to an alicyclic skeleton was used as the alicyclic structure-containing amine (E1) and that an adequate time of aging was conducted.

Example 6

The reactive silicon group-containing polyoxypropylene polymer (A-1) obtained in Synthesis Example 1 and the (meth)acrylic ester polymer (B-1) obtained in Synthesis Example 2 were mixed in such proportions that the amount of the polymer (A-1) was 42 parts by weight and the amount of solids of the polymer (B-1) was 28 parts by weight. After the mixing, isobutanol was removed by heating. The mixture thus obtained was mixed with 4 parts by weight of Ancamine K54 (2,4,6-tris(dimethylaminomethyl)phenol, manufactured by Evonik Industries) serving as the epoxy resin curing agent (D), 3 parts by weight of triethanolamine serving as the amino alcohol compound (E2), and 2 parts by weight of KBM-603 (N-(2-aminoethyl)-3-aminopropyltrimethoxysilane, manufactured by Shin-Etsu Chemical Co., Ltd.) serving as a silane coupling agent. The resulting mixture was used as the A part. Further, 30 parts by weight of jER 828 (bisphenol A epoxy resin, manufactured by Mitsubishi Chemical Corporation) serving as the epoxy resin (C), 0.3 parts by weight of NEOSTANN U-810 (dioctyltin dilaurate, manufactured by Nitto Kasei Co., Ltd.) serving as the silanol condensation catalyst (F), and 0.5 parts by weight of water were mixed, and the resulting mixture was used as the B part.

The dumbbell tensile properties were evaluated in the same manner as in Example 1. The results are shown in Table 3.

Example 7 and Comparative Examples 5 and 6

Compositions were prepared and evaluated for the dumbbell tensile properties in the same manner as in Example 6, except that the component proportions were changed as shown in Table 3. The results are shown in Table 3.

The superscripts used in Table 3 denote the following compounds.
(1): 2,4,6-Tris(dimethylaminomethyl)phenol (Evonik Industries)
(2): N-(2-Aminoethyl)-3-aminopropyltrimethoxysilane (Shin-Etsu Chemical Co., Ltd.)
(3): Bisphenol A epoxy resin (Mitsubishi Chemical Corporation)
(4): Dioctyltin dilaurate (Nitto Kasei Co., Ltd.)

TABLE 3

| Component proportions (parts by weight) | | | Example 6 | Example 7 | Comp. Example 5 | Comp. Example 6 |
|---|---|---|---|---|---|---|
| A part | Polyoxyalkylene polymer (A) | A-1 | 42 | 42 | 42 | 42 |
| | (Meth)acrylic ester polymer (B) | B-1 | 28 | 28 | 28 | 28 |
| | Epoxy resin curing agent (D) | Ancamine K54[1] | 4 | 4 | 4 | |
| | Amino alcohol compound (E2) | Triethanolamine | 3 | — | — | 3 |
| | | 2-Dimethylaminoethanol | | 3 | | |
| | Silane coupling agent | KBM-603[2] | 2 | 2 | 2 | 2 |
| | (A):(B) | | 60:40 | 60:40 | 60:40 | 60:40 |
| | Total parts by weight of A part | | 79 | 79 | 76 | 75 |

TABLE 3-continued

|  | Component proportions (parts by weight) |  | Example 6 | Example 7 | Comp. Example 5 | Comp. Example 6 |
|---|---|---|---|---|---|---|
| B part | Epoxy resin (C) | jER828[3] | 30 | 30 | 30 | |
| | Silanol condensation catalyst (F) | NEOSTANN U-810[4] | 0.3 | 0.3 | 0.3 | 0.3 |
| | Water | | 0.5 | 0.5 | 0.5 | 0.5 |
| | (A) + (B):(C) | | 70:30 | 70:30 | 70:30 | 70:30 |
| | Total parts by weight of B part | | 30.8 | 30.8 | 30.8 | 0.8 |
| | Dumbbell tensile properties | M30 (MPa) | 2.8 | 1.5 | 1.7 | 0.1 |
| | (At 80° C. for 30 min) | TB (MPa) | 5.2 | 5.6 | 6.5 | 1.2 |
| | | Young's modulus (MPa) | 20 | 11 | 5 | 4 |
| | | EB (%) | 145 | 230 | 210 | 290 |

Table 3 reveals that in Examples 6 and 7 where the amino alcohol compound (E2) was added, the stiffness (Young's modulus) exhibited as a result of the short heating step performed at 80° C. for 30 minutes was higher than in Comparative Example 5 where any amino alcohol compound (E2) was not added and Comparative Example 6 where the epoxy resin (C) was not added. It is also seen that in Example 6 where the amine added was triethanolamine which is a trialcoholamine, the stiffness was higher than in Example 7 where the amine added was 2-dimethylaminoethanol which is a monoalcoholamine.

In Example 6, after the about 2-mm-thick sheet formed from the mixture of the A and B parts was heated at 80° C. for 30 minutes as described above, the sheet was aged at 23° C. for 7 days, following which a No. 3 dumbbell specimen was punched out of the aged sheet and subjected to a tensile strength test as described above. The M30 was measured to be 6.0 MPa, the TB was measured to be 9.2 MPa, the Young's modulus was measured to be 90 MPa, and the EB was measured to be 180%. This leads to the conclusion that after being subjected to an adequate time of aging, the curable composition of Example 6 exhibits good cured product properties suitable for use as a structural adhesive.

Although the disclosure has been described with respect to only a limited number of embodiments, those skilled in the art, having benefit of this disclosure, will appreciate that various other embodiments may be devised without departing from the scope of the present disclosure. Accordingly, the scope of the invention should be limited only by the attached claims.

What is claimed is:

1. A multi-part curable composition comprising:
an A part including a polyoxyalkylene polymer (A) having a reactive silicon group, a (meth)acrylic ester polymer (B) having a reactive silicon group, an epoxy resin curing agent (D) having a tertiary amine moiety and being other than alicyclic structure-containing amines, and an alicyclic structure-containing amine (E1), each of the reactive silicon groups of the polyoxyalkylene polymer (A) and the (meth)acrylic ester polymer (B) being represented by the following formula (1): —SiR$^5_c$X$_{3-c}$ (1), wherein R$^5$ is a substituted or unsubstituted hydrocarbon group having 1 to 20 carbon atoms, X is a hydroxy group or a hydrolyzable group, and c is 0 or 1; and
a B part including an epoxy resin (C).

2. The multi-part curable composition according to claim 1, wherein the alicyclic structure-containing amine (E1) is a compound having an amino group bonded directly to an alicyclic skeleton.

3. A multi-part curable composition comprising:
an A part including a polyoxyalkylene polymer (A) having a reactive silicon group, a (meth)acrylic ester polymer (B) having a reactive silicon group, and an epoxy resin curing agent (D) having a tertiary amine moiety and being other than amino alcohol compounds, each of the reactive silicon groups of the polyoxyalkylene polymer (A) and the (meth)acrylic ester polymer (B) being represented by the following formula (1): —SiR$^5_c$X$_{3-c}$ (1), wherein R$^5$ is a substituted or unsubstituted hydrocarbon group having 1 to 20 carbon atoms, X is a hydroxy group or a hydrolyzable group, and c is 0 or 1; and
a B part including an epoxy resin (C),
wherein either or both of the A part and B part include an amino alcohol compound (E2).

4. The multi-part curable composition according to claim 3, wherein the amino alcohol compound (E2) is an amino alcohol compound having no aromatic ring.

5. The multi-part curable composition according to claim 3, wherein the wherein the amino alcohol compound (E2) is a trialcoholamine.

6. The multi-part curable composition according to claim 1, wherein the reactive silicon group of the polyoxyalkylene polymer (A) is a trimethoxysilyl group.

7. The multi-part curable composition according to claim 1, wherein the reactive silicon group of the (meth)acrylic ester polymer (B) is a trimethoxysilyl group.

8. The multi-part curable composition according to claim 1, wherein the polyoxyalkylene polymer (A) has a terminal moiety represented by the following formula (2):

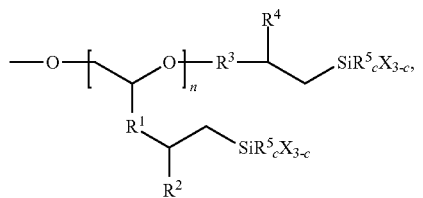

(2)

wherein $R^1$ and $R^3$ are each independently a divalent linkage group having 1 to 6 carbon atoms, the atoms of $R^1$ and $R^3$ that are bonded to carbon atoms adjacent respectively to $R^1$ and $R^3$ are each independently carbon, oxygen, or nitrogen, $R^2$ and $R^4$ are each independently hydrogen or a hydrocarbon group having 1 to 10 carbon atoms, n is an integer from 1 to 10, $R^5$ is the substituted or unsubstituted hydrocarbon group having 1 to 20 carbon atoms, X is the hydroxy group or the hydrolyzable group, and c is 0 or 1.

9. The multi-part curable composition according to claim 8, wherein $R^1$ is $CH_2OCH_2$ and $R^3$ is $CH_2$.

10. The multi-part curable composition according to claim 8, wherein $R^2$ and $R^4$ are each hydrogen.

11. The multi-part curable composition according to claim 1, wherein the (meth)acrylic ester polymer (B) is a polymer containing constituent monomers including: a monomer (b1) having a reactive silicon group and a polymerizable unsaturated group; and a macromonomer (b2) that is a (meth)acrylic ester polymer having a polymerizable unsaturated group.

12. A structural adhesive comprising the multi-part curable composition according to claim 1.

13. A cured product obtained by curing the multi-part curable composition according to claim 1.

14. The multi-part curable composition according to claim 3, wherein the reactive silicon group of the polyoxyalkylene polymer (A) is a trimethoxysilyl group.

15. The multi-part curable composition according to claim 3, wherein the reactive silicon group of the (meth)acrylic ester polymer (B) is a trimethoxysilyl group.

16. The multi-part curable composition according to claim 3, wherein the polyoxyalkylene polymer (A) has a terminal moiety represented by the following formula (2):

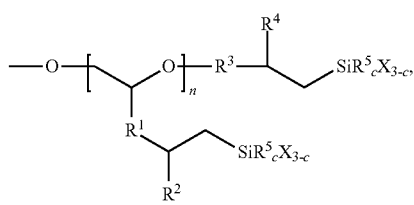

(2)

wherein $R^1$ and $R^3$ are each independently a divalent linkage group having 1 to 6 carbon atoms, the atoms of $R^1$ and $R^3$ that are bonded to carbon atoms adjacent respectively to $R^1$ and $R^3$ are each independently carbon, oxygen, or nitrogen, $R^2$ and $R^4$ are each independently hydrogen or a hydrocarbon group having 1 to 10 carbon atoms, n is an integer from 1 to 10, $R^5$ is the substituted or unsubstituted hydrocarbon group having 1 to 20 carbon atoms, X is the hydroxy group or the hydrolyzable group, and c is 0 or 1.

17. The multi-part curable composition according to claim 3, wherein the (meth)acrylic ester polymer (B) is a polymer containing constituent monomers including: a monomer (b1) having a reactive silicon group and a polymerizable unsaturated group; and a macromonomer (b2) that is a (meth)acrylic ester polymer having a polymerizable unsaturated group.

18. A structural adhesive comprising the multi-part curable composition according to claim 3.

19. A cured product obtained by curing the multi-part curable composition according to claim 3.

* * * * *